United States Patent
Shveidel et al.

(10) Patent No.: US 11,803,314 B2
(45) Date of Patent: Oct. 31, 2023

(54) TECHNIQUES FOR PERFORMING METADATA UPDATES

(71) Applicant: Dell Products L.P., Hopkinton, MA (US)

(72) Inventors: Vladimir Shveidel, Pardes-Hana (IL); Bar David, Rishon Lezion (IL); Ami Sabo, Netanya (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/580,104

(22) Filed: Jan. 20, 2022

(65) Prior Publication Data
US 2023/0229332 A1    Jul. 20, 2023

(51) Int. Cl.
G06F 3/06 (2006.01)

(52) U.S. Cl.
CPC ............ *G06F 3/0644* (2013.01); *G06F 3/061* (2013.01); *G06F 3/0673* (2013.01)

(58) Field of Classification Search
CPC ....... G06F 3/0644; G06F 3/061; G06F 3/0673
See application file for complete search history.

(56) References Cited

U.S. PATENT DOCUMENTS

2021/0286537 A1\* 9/2021 Shveidel ................. G06F 3/061

OTHER PUBLICATIONS

U.S. Appl. No. 16/260,660, filed Jan. 29, 2019, entitled System and Method for Aggregating Metadata Changes in a Storage System, to Vladimir Shveidel, et al.

\* cited by examiner

*Primary Examiner* — Edward J Dudek, Jr.
(74) *Attorney, Agent, or Firm* — Muirhead and Saturnelli, LLC

(57) ABSTRACT

In at least one embodiment, processing can include receiving a metadata (MD) update for a MD page, wherein the MD update has an associated type; determining whether the type is a custom MD type; responsive to determining the type is a custom MD type, performing first processing including: determining a custom bucket handle for the MD update based at least in part on the type and a logical index (LI) uniquely identifying the MD page; and applying the MD update to a custom bucket associated with the custom bucket handle; and responsive to determining the type is a custom MD type, performing second processing including: determining a regular bucket handle for the MD update based at least in part on the LI of the MD page; and applying the MD update to a regular bucket associated with the regular bucket handle.

20 Claims, 14 Drawing Sheets

TECHNIQUES FOR PERFORMING METADATA UPDATES

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving a first metadata (MD) update for a first MD page, wherein the first MD update has an associated first type; determining whether the first type is included in a first set of custom MD types; responsive to determining the first type is included in the first set of custom MD types, performing first processing including: determining a first custom bucket handle for the first MD update based at least in part on the first type and a first logical index (LI) uniquely identifying the first MD page from a plurality of MD pages; and applying the first MD update to a first custom bucket associated with the first custom bucket handle; and responsive to determining the first type is not included in the first set of custom MD types, performing second processing including: determining a first regular bucket handle for the first MD update based at least in part on the first LI of the first MD page; and applying the first MD update to a first regular bucket associated with the first regular bucket handle.

In at least one embodiment, determining the first regular bucket handle for the first MD update based at least in part on the first LI of the first MD page, as included in the second processing, can further include determining, using a hash function, a first hash value for the first MD update based at least in part on the first LI of the first MD page. The first regular bucket handle can be determined, at least in part, based on the first hash value. The first regular bucket handle can be a bucket number or identifier that identifies the first regular bucket included in a plurality of regular buckets. Each of the plurality of regular buckets can be associated with a different one of a first plurality of MD pages; and the first plurality of MD pages can be included in the plurality of MD pages. A rate or frequency of MD updates expected for each of the first plurality of MD pages can be below a specified threshold. The first processing can include storing the first MD update as an entry in the first regular bucket.

In at least one embodiment, the first custom bucket can be one of a plurality of custom buckets. The plurality of custom buckets can be associated with a second plurality of MD pages, and a rate or frequency of MD updates expected for each of the second plurality of MD pages can be above a specified threshold. The second plurality of MD pages can be included in the plurality of MD pages. The first custom bucket can be associated with at least one of the second plurality of MD pages. The first custom bucket can be associated with at least two MD pages of the second plurality of MD pages, and wherein the first custom bucket can include fields or entries corresponding to data items of the at least two MD pages. The at least one MD page associated with the first custom bucket can include a plurality of counters, and the first custom bucket can include a plurality of fields or entries corresponding to the plurality of counters. Each of the plurality of fields or entries of the first custom bucket can be associated with one of the plurality of counters of the at least one MD page, and said each field or entry associated with said one counter can denote an aggregated value of updates to said one counter. The aggregated value of updates to said one counter can denote a relative amount by which to modify a current value of said one counter of the at least one MD page as stored in a persistently stored MD page store. The MD page store can be provisioned from non-volatile storage of physical storage devices providing backend non-volatile storage in a data storage system.

In at least one embodiment, the first type can be included in the first set of custom MD types, the first processing can be performed, the first MD page can be included in the at least one MD page associated with the first custom bucket, the first MD page can include a first plurality of counters, the first custom bucket can include a first plurality of fields or entries each associated with a corresponding one of the first plurality of counters, and each of said first plurality of fields or entries associated with said corresponding one counter of the first plurality can denote an aggregated value of updates to said corresponding one counter. The aggregated value of updates to said corresponding one counter can denote a relative amount by which to modify a current value of said one corresponding counter of first MD page as stored in a persistently stored MD page store.

In at least one embodiment, processing can include destaging MD updates to the first MD page, wherein destaging can further include: reading a current version of the first MD page from the MD page store; applying MD updates denoted by the first plurality of fields or entries of the first custom bucket to the first plurality of counters of the first MD page thereby generating an updated version of the first MD page; and persistently storing the updated version of the first MD page in the MD page store whereby the updated version of the first MD page replaces the current version of the first MD page in the MD page store. The first MD update can be represented as a tuple including the LI, the first type, an entry index (EI) and a first value. The first MD update can be an update to a first counter of the first plurality of counters of the first MD page having an associated first field or entry of the first plurality of fields or entries of the first custom bucket; wherein the EI can be used, at least in part, in determining the first field or entry of the first custom bucket associated with the first counter. The first value can denote an amount by which to adjust the first counter.

In at least one embodiment, the first type can be included in the first set of custom MD types, and processing can include specifying a plurality of callbacks for the first type, wherein each of the plurality of callbacks can denote one of a plurality of code entities that performs customized processing for one of a plurality of operations in connection with MD updates to a MD page of the first type. The plurality of callbacks can include a first callback that applies MD updates, a second callback that destages MD updates, and a third callback that creates a custom bucket. Processing can include: invoking the first callback to apply the first MD update for the first MD page to the first custom bucket, wherein the first callback performs processing including said applying of the first processing; invoking the second callback to destage MD updates of the first custom bucket for the first MD page; and invoking the third callback to create the first custom bucket.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

In some systems, such as data storage systems, updates to metadata (MD) can be stored in an in-memory structure.

Each individual update to a particular MD page can be recorded as a separate entry in a bucket of updates associated with the particular MD page. A majority of the updates to the MD pages can be characterized as generally random and evenly distributed among the buckets of updates associated with the MD pages. However, there can be at least some MD pages that are more frequently updated than the remaining MD pages. In this case, the more frequently updated MD pages can generally be expected to have a larger number of updates or entries recorded in the buckets associated with the more frequently updated MD pages in comparison to other buckets associated with the remaining less frequently updated MD pages. As a result, additional system resources and time can be expended in using and managing the buckets associated with the more frequently updated MD pages. In some cases, the buckets of updates associated with the more frequently updated MD pages can include a very large number of updates, such as thousands of updates, in comparison to a very small number of updates, such as ten or less, experienced by the remaining infrequently updated MD pages. As a result, the overall performance of the system and resource utilization can be adversely impacted.

Accordingly, described in the following paragraphs are techniques of the present disclosure that can be used in optimizing the structures and processing associated with metadata updates of frequently updated MD pages.

The foregoing and other aspects of the techniques of the present disclosure are described in more detail in the following paragraphs.

Figure 1:
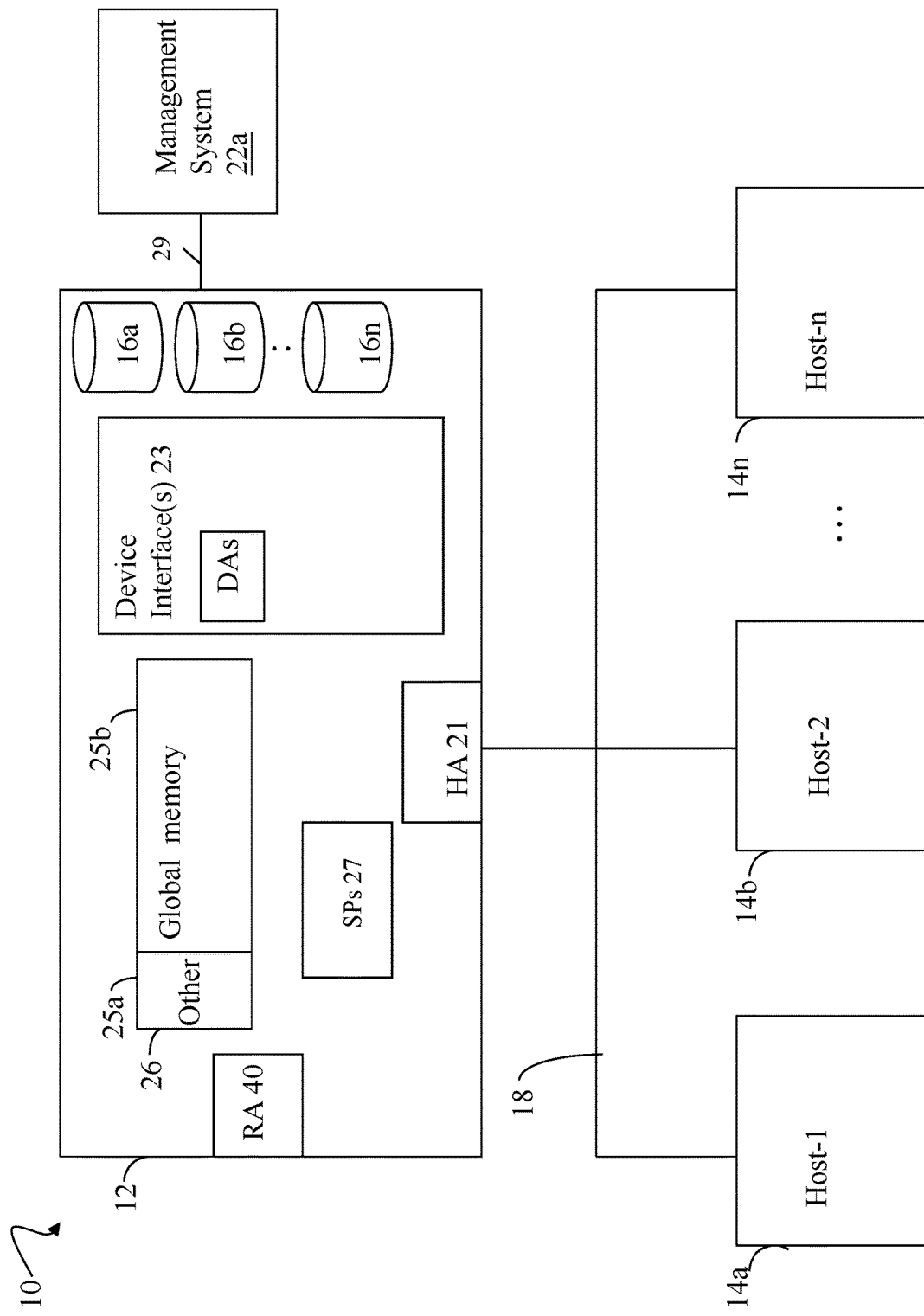
FIG. 1 is an example of components that may be included in a system in accordance with the techniques of the present disclosure.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2:
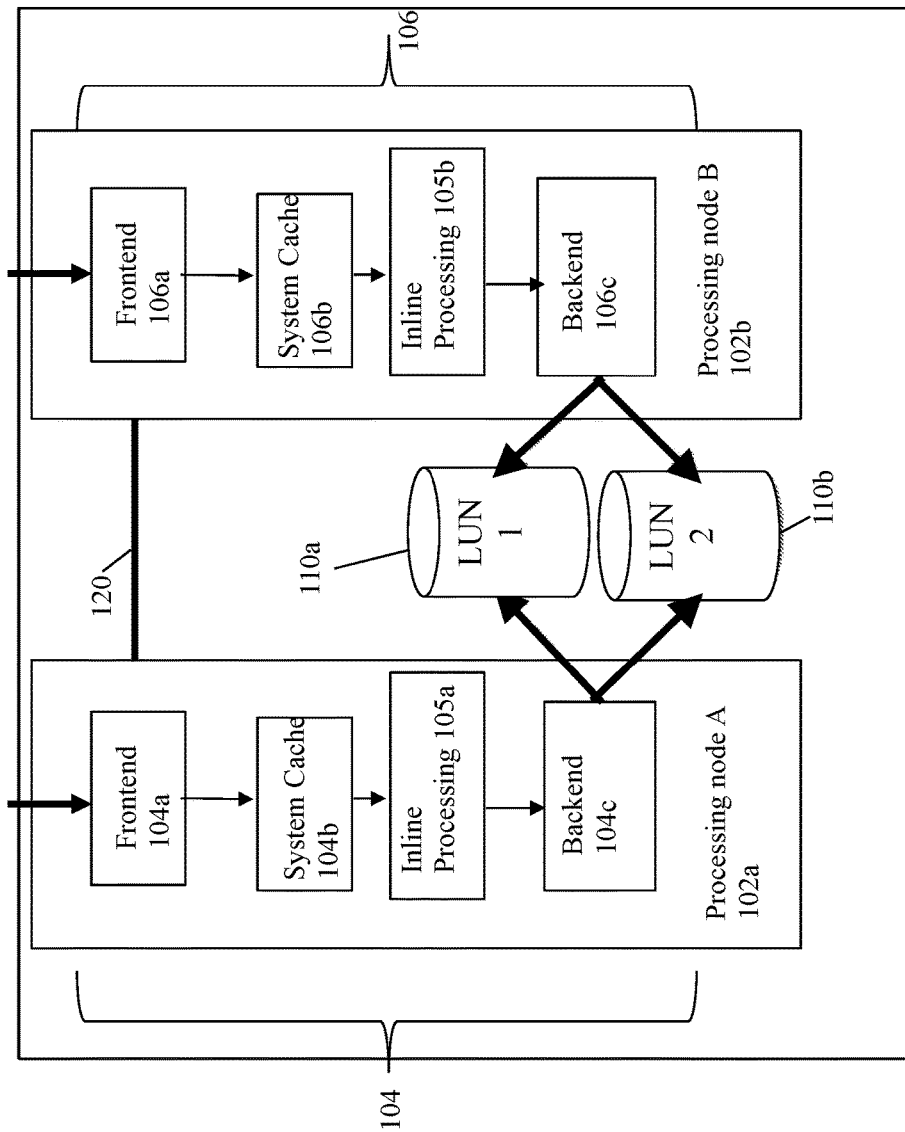
FIG. 2 is an example illustrating the I/O path or data path in connection with processing data in at least one embodiment in accordance with the techniques of the present disclosure.

With reference to the FIG. 2, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2, for write operations, latency can be affected by the amount of time taken to store the write data in the log where the write data is visible to both nodes or controllers of the system.

Consistent with other discussion herein, the log file can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
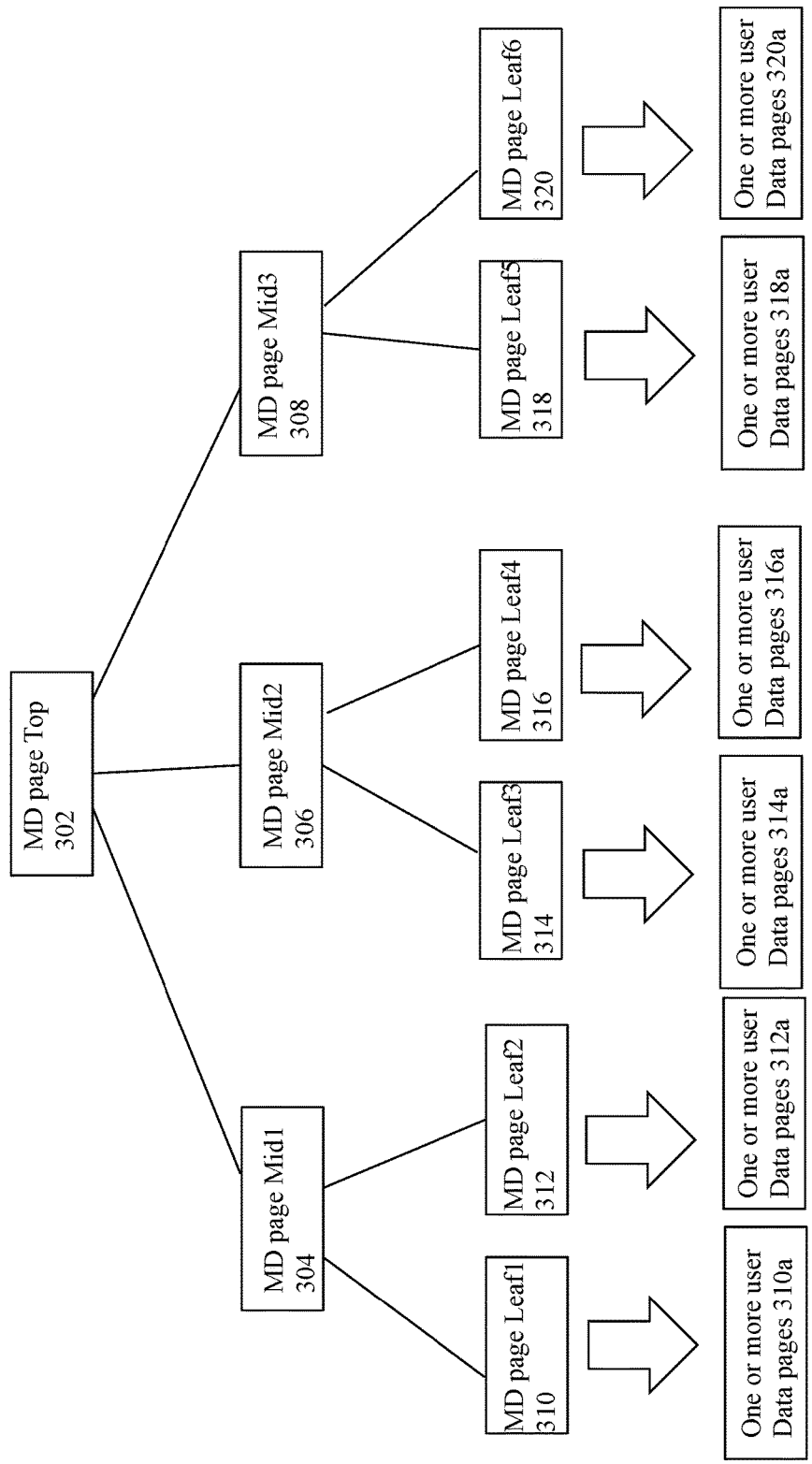
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
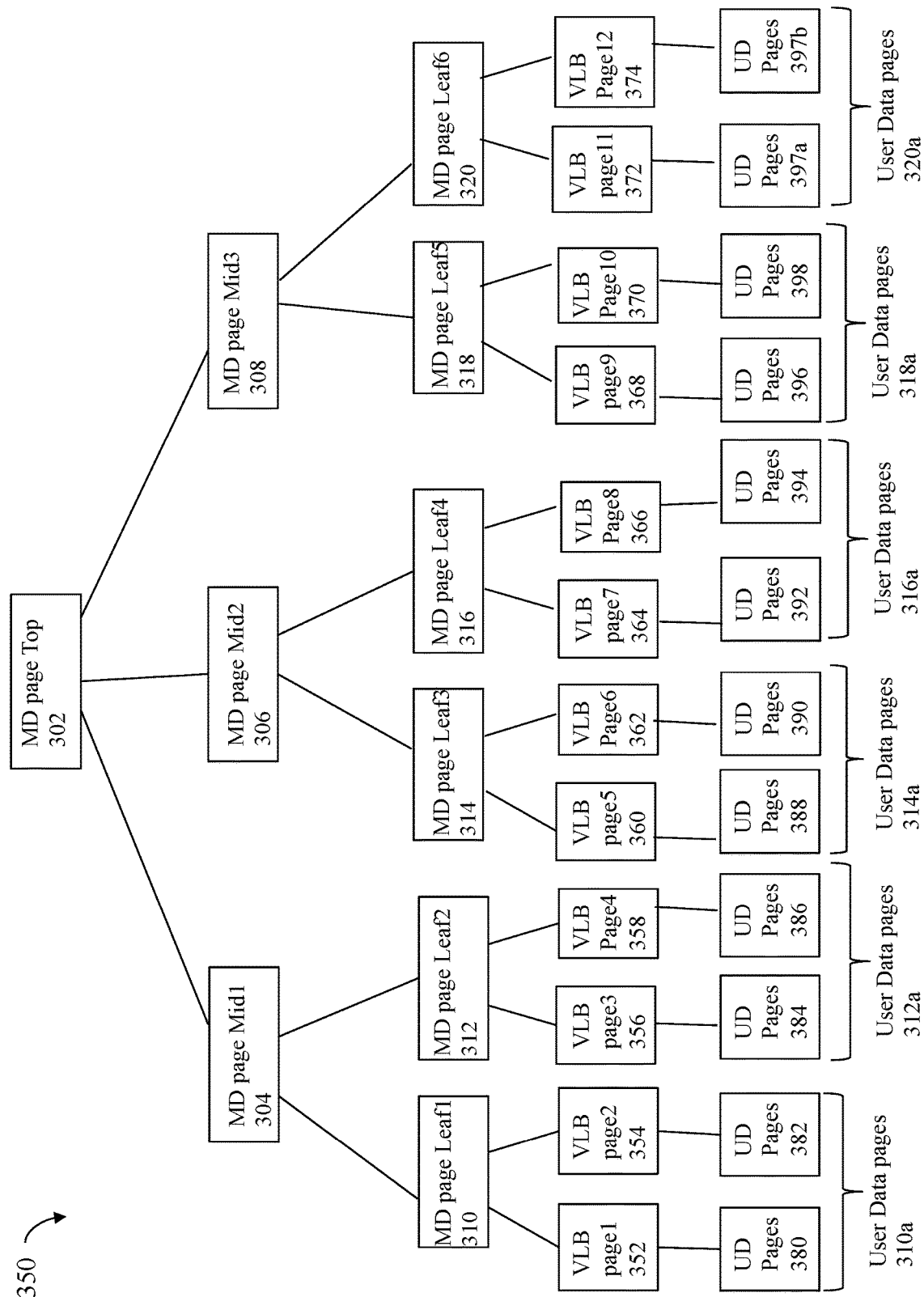

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of VLB (virtual layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages— MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559.

The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
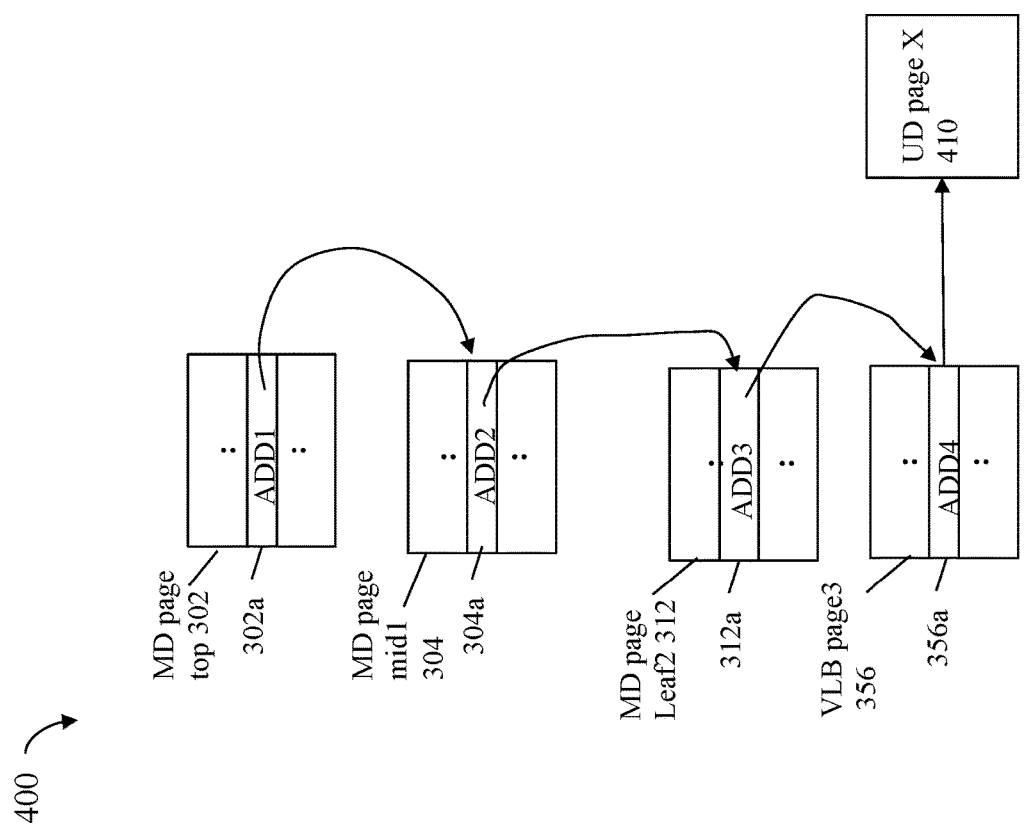

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
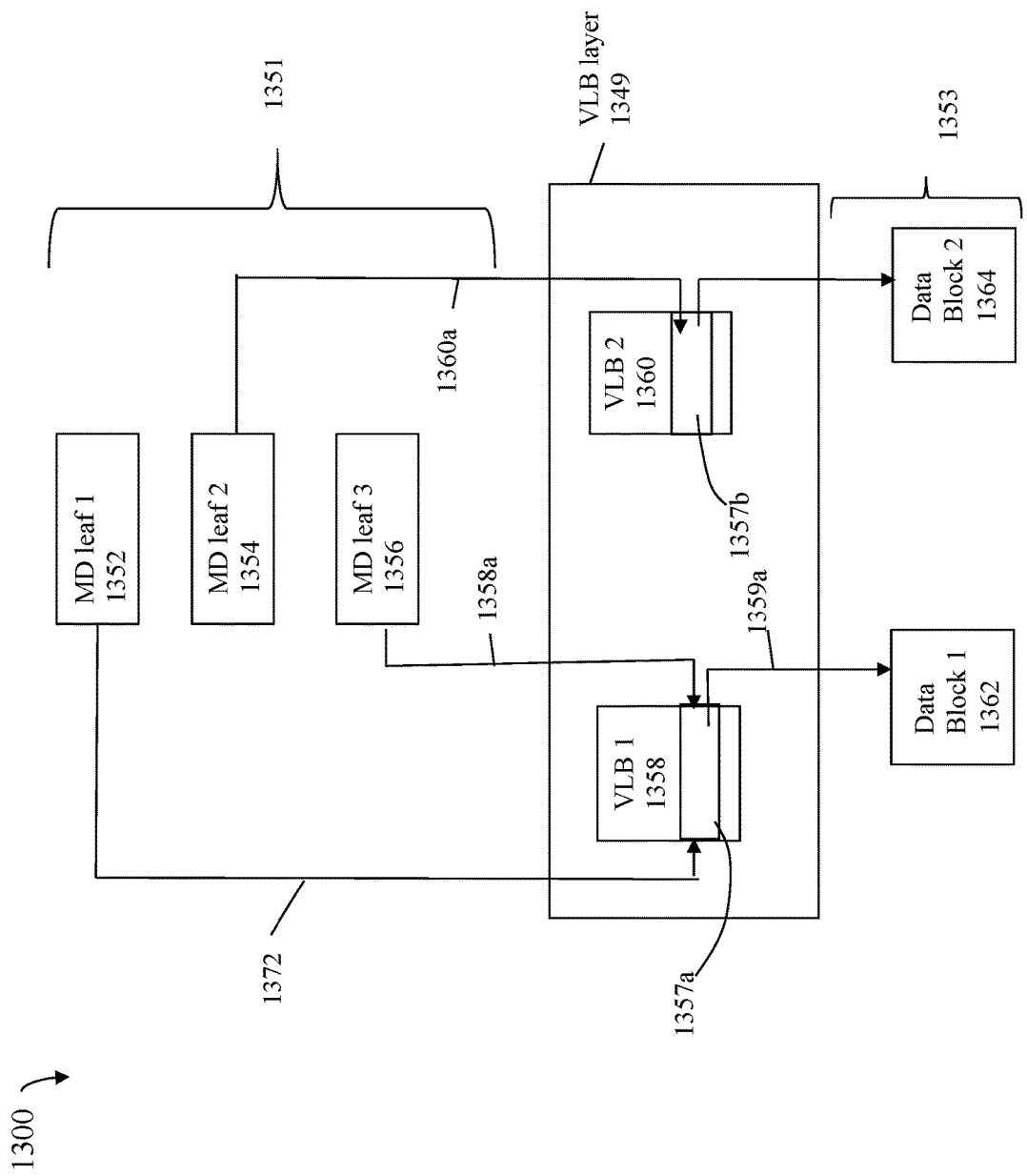

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include a pointer to, or address of, the user data block 1362.

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include a pointer to, or address of, the user data block 1362.

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include a pointer to, or address of, the user data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6. In at least one embodiment, the MD or mapping information used in connection with stored user data can be stored on non-volatile storage, such as on the BE PDs of the appliance or data storage system. At least some of the MD or mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at physical storage locations on the BE PDs. Additionally, the MD or mapping information corresponding to the logged writes being flushed can also be accordingly updated to reference the physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some existing implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

In at least one implementation, many read and write operations performed with respect to a MD page may only need, respectively, to read or update one field or value of the MD page. For example, a MD update to a MD page can require only updating a relatively small number of bytes, such as 4 bytes or 8 bytes, of a much larger MD page, such as a 4K byte MD page. However, as noted above, existing workflows for some implementations to perform reads and writes to the MD page can include loading the entire MD page into the cache or volatile memory of a node, if the MD page is not already in the cache or volatile memory of the node.

In this manner, existing implementations and workflows such as noted above can consume an excessive of amount of system resources, such as memory and CPU or processor execution time, resulting in performance degradation.

To improve upon the foregoing, a metadata log architecture can be used which includes a metadata log where updates to MD pages are recorded using only the changes, updates or "deltas" made to the MD pages. For example, many updates to a MD page can be an update or write of a relatively small number of bytes, such as 4 bytes or 8 bytes, of a much larger MD page, such as a 4K byte MD page.

In at least one embodiment in accordance with the techniques of the present disclosure, the metadata updates, changed content, changes or "deltas" made to MD pages (rather than complete updated MD pages) can be recorded in a metadata log as stored on a log tier of non-volatile memory. Additionally, in at least one embodiment in accordance with the techniques of the present disclosure, the metadata updates, changes or deltas made to at least some of the MD pages can also be stored in local volatile memories of the nodes of the system. The node local in-memory copy of the metadata changes, updates or deltas made to MD pages as stored on each of the nodes can also sometimes be referred to herein as the in-memory log, in-memory delta log or in-memory metadata log used by each node in connection with performing processing in accordance with the techniques of the present disclosure.

At least one embodiment in accordance with the techniques herein can use various structures, organizations and other techniques as described, for example, in U.S. patent application Ser. No. 16/260,660, SYSTEM AND METHOD FOR AGGREGATING METADATA CHANGES IN A STORAGE SYSTEM, Shveidel et al., now U.S. Patent Publication 2020/0241793A1, published Jul. 30, 2020, (also sometimes referred to herein as the '660 patent application or '660 application) which is incorporated by reference herein in its entirety. Some of the structures and organization as described in the '660 application that can be used in connection with the techniques of the present disclosure are generally described in the following paragraphs with additional modifications made for use with the techniques of the present disclosure.

In at least one embodiment, each metadata update, change or delta made to a MD page may be expressed in the form of a tuple represented as (LI, EI, T, V) where:

LI denotes the logical index of the MD page. The LI can be a unique index of the MD page that is updated. The LI can be used to uniquely identify the MD page in the MD or mapping structure such as described elsewhere herein (e.g., FIGS. 3-6).

EI denotes the entry index denoting a particular entry, offset or location in the MD page denoted by LI.

T denotes the type of metadata update. For example, in at least one embodiment there can be multiple predefined types or allowable values for T. For example, the predefined types or values for T may include one or more of: IDP denoting an update to an address or indirect pointer used to reference a data block (e.g., the indirect pointer may be point to, or be the address of, a VLB entry that further includes an address of, or pointer to, the data block containing user data); INCREF denoting an update to increment by 1 a reference count of a VLB entry associated with a data block containing content that may be stored at one or more logical addresses; DECREF denoting an update to decrement by 1 a reference count of a VLB entry associated with a data block containing content that may be stored at one or more logical addresses. Generally, an embodiment can include any suitable number of predefined types that may vary with the supported metadata updates or changes.

V denotes the updated value to be stored.

It should be noted that the particular value of T denoting a particular type can also denote the size of the data payload V or updated value V of the tuple. For example, a type for T denoting an address can indicate that the size of V is the size or number of bytes or bits of an address or pointer. As another example, a type of T denoting an integer counter can indicate that the size of V is the size of an integer, such as 32 bits. In some instances, the value of the type T can imply performing an operation such as increment a counter by 1, or decrement a counter by 1, as noted above. In such cases, and in some embodiments, the value for V of the tuple can be implied and omitted when T indicates to perform an increment or decrement operation of a field since such an increase or decrease can be with respect to a current or existing value of the counter.

In at least one embodiment, the metadata changes, updates or deltas made to MD pages as recorded in the in-memory metadata logs of the nodes can be in the form of tuples. In at least one embodiment, the metadata changes, updates or deltas made to MD pages as recorded in the metadata log stored on NVRAM can also be in the form of tuples.

Figure 7A:
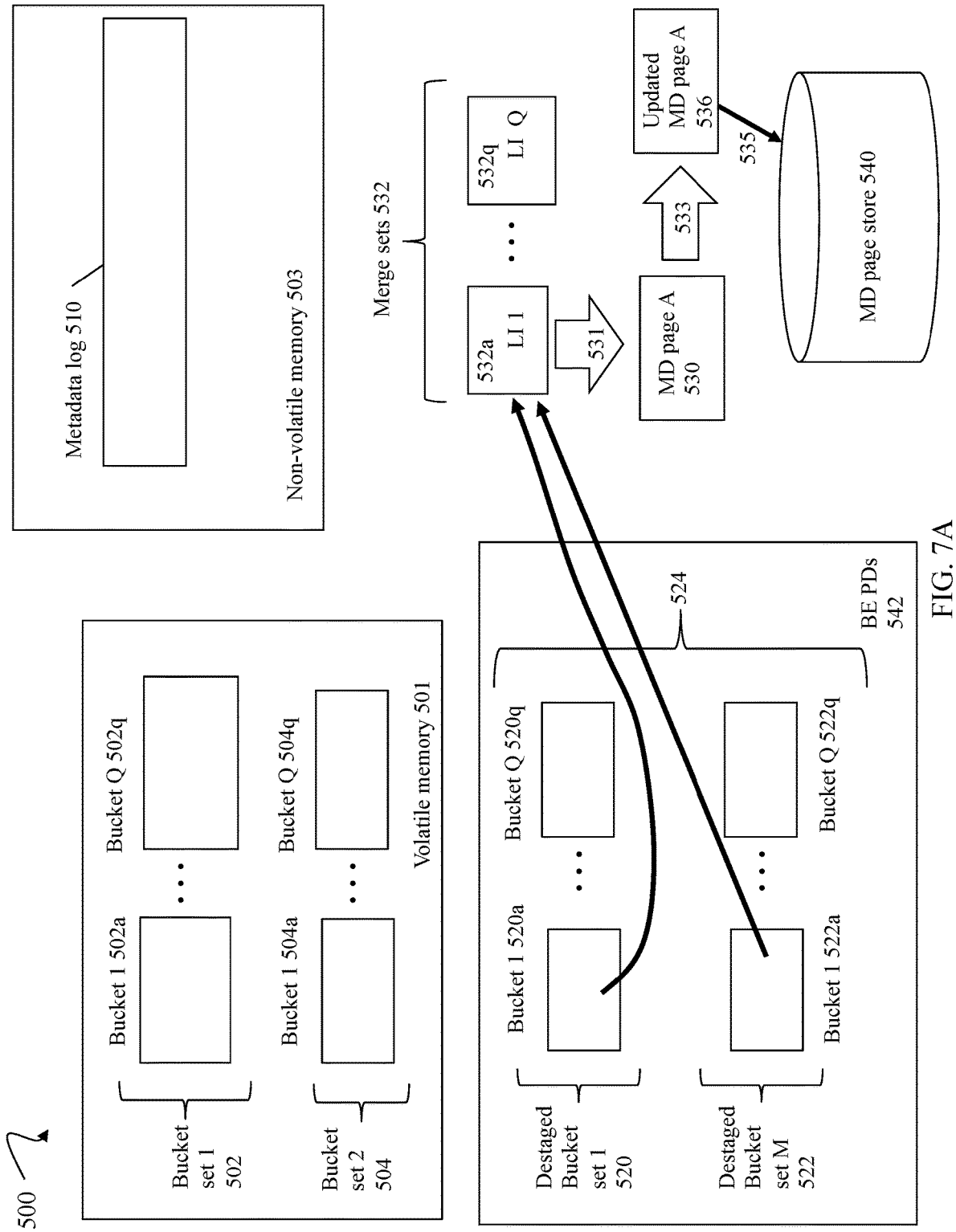
FIG. 7A is an example illustrating structures and associated data flow in at least one embodiment in accordance with the techniques of the present disclosure.

Referring to FIG. 7A, shown is an example 500 illustrating structures and associated data flow in at least one embodiment in accordance with the techniques of the present disclosure.

The example 500 includes volatile memory 501, non-volatile memory 503 and non-volatile storage on the BE PDs 542. The volatile memory 501 can denote a volatile memory as included in each node of the appliance or system which includes node local in-memory structures and cached data that can be used in connection with the techniques herein. In particular, the volatile memory 501 includes bucket sets 502, 504 of logged metadata changes, updates or deltas. The non-volatile memory (e.g., NVRAM) 503 includes the metadata log 510 of metadata updates, changes or deltas. Consistent with other discussion herein, the non-volatile memory 503 can be accessible to both nodes of the system.

Collectively, the structures or bucket sets 502, 504 can denote the in-memory metadata log or in-memory delta log including the recorded metadata updates or deltas to MD pages for a particular node. Thus, each node in a dual node appliance can include an instance of the volatile memory 501 and associated structures or bucket sets 502, 504.

In at least one embodiment in accordance with the techniques herein, metadata changes, updates or "deltas" made to MD pages can be recorded and stored in a volatile memory structure in the volatile memory 501 of each node of the system. In this manner, an individual write or update to a MD page can be recorded as a single metadata update or entry in the volatile memory structure. For example, a write that updates only a 4 byte or 8 byte field of a 4K byte MD page can be recorded in the volatile memory structure as a single metadata update. Each metadata update can be represented as a tuple as discussed elsewhere herein in more detail. In at least one embodiment, each tuple can be relatively small in comparison to the size of each MD page.

The volatile memory 501 of each node can include volatile memory structures 502, 504. In at least one embodiment, the structures 502, 504 can denote two bucket sets 502, 504 where at any point in time, one of the two buckets sets 502, 504 can be designated as the active set and the remaining bucket set can be designated as the destaging or inactive set. Each metadata update to a MD page can be added to a corresponding one of the buckets of the active bucket set that is uniquely associated with the MD page. For example at a first point in time, the bucket set 1 502 can be active and the bucket set 2 504 can be inactive, where received metadata updates are stored in the bucket set 502. As described in more detail in the following paragraphs, the roles of active and inactive or destaging can be alternated or switched between the two bucket sets 502, 504 in a continuous manner as the currently active set is deemed full or ready for destaging to the BE PDs 542.

The bucket set 1 502 includes the buckets 502a-502q, and the bucket set 2 504 includes the buckets 504a-504q, where there are "q" metadata pages. In each of the bucket sets 502, 504, each bucket can correspond uniquely to a different MD page. The metadata updates of a particular bucket are the recorded metadata updates to the MD page associated with the particular bucket of each bucket set. For example, MD page A can be uniquely associated with, and mapped to, the first buckets 502a, 504a, respectively, in each of the bucket sets 502, 504. In this manner, the bucket 1 502a includes the metadata updates made to the MD page A when the bucket set 502 is the active set; and the bucket 1 504a includes the metadata updates made to the MD page A when the bucket set 504 is the active set.

Each of the bucket sets 502, 504 in at least one embodiment can be further organized as a hash table of buckets where each MD page is mapped to a particular bucket using a hash function. The hash function can map the logical index (LI) uniquely identifying a MD page to a corresponding bucket of metadata updates for the MD page. In at least one embodiment, each of the bucket sets 502, 504 can denote a hash table of buckets implemented as an array, where the hash value HV1 of the LI of a MD page denotes the index of the array and the bucket associated with the MD page. Within each bucket associated with a MD page, the metadata updates can be sorted in a time order, from oldest to newest, based on when the metadata updates are received in the system. In at least one embodiment, each bucket (e.g., 502a) of metadata updates for a MD page can be organized in a binary tree. The metadata updates can be represented as nodes or entries in the binary tree. The metadata updates or nodes of the binary tree can be sorted, at least in part, based on the time order of when the metadata updates are received by the system. The increasing time order can indicate the order in which the metadata updates or changes are applied to the MD page associated with the bucket or binary tree.

More generally, an embodiment in accordance with the techniques herein can use any suitable volatile memory structure(s) and organization to store the metadata updates, changes or deltas to the MD pages.

In at least one embodiment, when a new metadata update U1 is made to a MD page, the metadata update U1 can be represented as a tuple. The metadata update U1 can be inserted into the active bucket set as follows. The hash function H is used to calculate a hash value HV of the LI of the MD page (e.g., H(LI)=HV). The HV can denote the bucket uniquely associated with the MD page being updated. For example, assume the bucket set 502 is the active set and assume that the MD page A is being updated with the new metadata update U1. The MD page A can have an LI that generates a hash value=1 mapping to the first bucket, bucket 1 502*a*, of the bucket set 502. The bucket 502*a* can be a binary tree including metadata updates to the MD page A. The metadata update U1 can be inserted into the sorted binary tree of 502*a* based, at least in part, on when the metadata change U1 was received.

Consistent with other discussion herein, the volatile memory 501 can include 2 sets of buckets 502, 504. At a first point in time T1, a first set of buckets, such as 502, can be designated as the active set and the second set of buckets 504 can be designated as the inactive set of buckets. Consistent with other discussion herein, each bucket in a set includes the metadata updates or changes for a particular one of the MD pages associated with the bucket. Thus, metadata changes received for a particular MD page are located in the bucket associated with the MD page. The role assignments of active and inactive can be continuously switched between the two bucket sets 502, 504 of a node at subsequent points in time as the currently designated active set becomes full. In at least one embodiment, the role assignment switching between the two sets of buckets can be performed when at least one bucket in the active set becomes full, or more generally reaches a predefined maximum size limit. In some implementations, each data container can have a predefined data limit before the data container is considered "full". For example, metadata updates to a MD page associated with each bucket can be written to the BE PDs of the system as a separate page (e.g., 4 KB). In this example, the page size can determine the predefined data limit of a bucket. In other words, once a bucket includes a page-worth of metadata changes, processing can determine that the data container is "full".

To further illustrate, at a second point in time T2 subsequent to T1, the first set of buckets 502 currently designated as the active set becomes full and, in response, the second set of buckets 504 can be assigned as the active set and the first set 502 can be assigned as the inactive set. At the second point in time, metadata updates can be destaged from the inactive first set of buckets 502 in volatile memory to the BE PDs 542 such as, for example, in the first phase of destaging as mentioned elsewhere herein. New metadata updates received subsequent to T2 while the bucket set 502 is inactive or destaged are stored in the set of buckets 504 designated as the currently active set of buckets. At a third point in time T3 subsequent to T2, the second set of buckets 504 currently designated as the active set becomes full, and in response, the first set of buckets 502 can be assigned as the active set and the second set 504 assigned as the inactive set. Metadata updates can now be destaged from the second set 504 designated as the inactive set while subsequent metadata updates are now stored in the first set 502 designated as the active set. The foregoing switching of roles of active and inactive between the two sets of buckets 502, 504 can be repeatedly performed in an ongoing manner where new metadata updates are stored in the currently designated active set and where metadata updates of the other currently designated inactive set are destaged from the volatile memory 501 to the BE PDs 542.

In at least one embodiment in accordance with the techniques herein, one or more sets of the metadata updates for the MD pages can be destaged in a first phase of destaging from the volatile memory 501 to the BE PDs 542 providing non-volatile backend storage. As mentioned above, metadata updates can be destaged in the first phase of destaging from the particular one of the bucket sets 502, 504 designated as the inactive set. Over time, multiple bucket sets 524 can be destaged from the volatile memory 501 (e.g., of each of the nodes) to the BE PDs 542 in the first phase of destaging. The destaged bucket sets 524 in this example include M destaged bucket sets indicating that M sets of Q buckets have been destaged from the volatile memory 501 (e.g., as included in each of the nodes) to the BE PDs 542, where the M destaged bucket sets 524 are awaiting further processing in the subsequent second phase of destaging.

The destaged bucket sets 524 of metadata updates for the MD pages can be stored and organized on the BE PDs in a manner as described in the '660 application or any other suitable structures and organization. For example, each destaged bucket set of metadata updates for MD pages can be organized into buckets of bucket pages, where each bucket can correspond or map uniquely to a single MD page. For example, the bucket 1 520*a* of the destaged bucket set 1 520 can include metadata updates for the MD page A as noted above. The bucket (e.g., 520*a*) of one or more bucket pages associated with a single MD page (e.g., MD page A) can include one or more metadata changes made to the MD page, where the metadata changes can be represented as tuples in the volatile memory structure (e.g., bucket sets 502, 504) of the volatile memory 501. The metadata changes in each bucket, such as 520*a*, of 524 can be sorted based on insertion time and therefore denote the sorted increasing time order in which the metadata changes are applied to the MD page. In at least one embodiment, the bucket pages of each bucket of 524 can be organized as a list rather than, for example, a binary tree structure as described above in connection with the organization of metadata updates in the volatile memory 501. In at least one embodiment as denoted by the element 524, there can be multiple sets of metadata updates for MD pages stored on the BE PDs 542, where each of the multiple destaged bucket sets of 524 can denote a set of metadata updates destaged from the buckets sets 502, 504 of volatile memory at a different point in time.

In a second phase of destaging, metadata changes, updates or "deltas" from the multiple destaged bucket sets 524 made to the same single MD page can be aggregated and combined into a working set (sometimes referred to as a data container working set) of metadata updates for the MD page. The second phase of destaging can aggregate and combine the metadata updates for each MD page across the multiple destaged sets (520, 522) of metadata updates as stored on the BE PDs in the first phase of destaging. Thus a working set or merge set of metadata updates for a single MD page can denote aggregated metadata updates to the MD page, where the metadata updates can be located in the multiple destaged sets of updates 524 stored on the BE PDs 542. An existing or current version of the MD page can be read from the BE PDs. The working set of metadata changes for the MD page can be applied to, or combined with, the current MD page to thereby result in an updated version of the MD page. The updated MD page can then be persistently stored on the BE PDs replacing the prior current or existing version of the MD page.

To further illustrate, consider the MD page A 530 having an associated LI=1 that maps to the first bucket (e.g., 520*a*, 522*a*) in each of the M destaged bucket sets of 524. The second phase of destaging can aggregate and combine the metadata updates for the MD page A 530 from the first buckets (e.g., 520*a*, 522*a*) across the multiple M destaged sets 524 of metadata updates as stored on the BE PDs 542 in the first phase of destaging. The element 532a can denote the merge set of aggregated updates from the first buckets 520a, 522a of the destaged sets 524 for the MD page A 530. Thus the merge set or working set 532a of metadata updates for the MD page 530 can denote aggregated metadata updates to the MD page, where the metadata updates can be located in the multiple destaged sets 524 of updates stored on the BE PDs. An existing or current version 530 of the MD page can be read from the BE PDs. The merge set or working set 532a of metadata changes for the MD page A can be applied to (531) the current MD page A 530 to thereby generate (533) an updated version of the MD page A 536. The updated MD page 536 can then be persistently stored (535) on the MD page store 540 of the BE PDs replacing the prior current or existing version of the MD page 530.

Generally, the element 532 denotes the merge sets of aggregated metadata updates for all the MD pages. In this example, there are Q MD pages, where each of the Q MD pages can be uniquely associated with a corresponding one of the merge sets 532a-q based on the LI of each of the Q MD pages.

In at least one embodiment in accordance with the techniques herein, the metadata changes, updates or deltas can be recorded in the metadata log 510 The metadata log 510 can be stored in the non-volatile memory 503, such as non-volatile Random Access Memory (NVRAM). In some implementations, the metadata log 510 can store metadata updates in time order (e.g., sorted oldest to newest). In some implementations, the metadata log 510 can be used to recover and reconstruct in-memory structures, such as structures of the volatile memories of the nodes of the data storage system. The metadata log 510 can be used to perform such recovery or reconstruction of the in-memory structures, for example, in response to a failure of the volatile memory of a node, or in response to a restart or reboot of a node or data storage system.

In some implementations and in response to destaging or writing the one or more metadata changes from the volatile memory 501 to the BE PDs 542 in the first phase of destaging, processing can be performed to release or free the corresponding part of the metadata log storing the destaged metadata changes. In at least one embodiment, the persisted metadata log 510 can be implemented as a ring buffer. Ring buffers are generally known in the art. A ring buffer can be represented as a logical ring of records or entries. The ring buffer can be maintained using pointers, such as a head pointer and a tail pointer, where new entries of the ring can always be allocated from the head and space reclamation can always be done from the tail. When an entry at the tail is flushed or destaged, the entry can be freed and thus reclaimed for reuse. The tail can be advanced as entries are flushed. In a similar manner, as entries are allocated, the head pointer is advanced. In at least one embodiment, entries from the metadata log 510 can be reclaimed as corresponding entries denoting the same metadata changes or deltas are destaged in the first phase of destaging from the in-memory metadata logs of the nodes (e.g., volatile memories 501 of the nodes) to the BE PDs 542. In such an embodiment, the destaging of metadata updates or changes as recorded in the in-memory metadata logs of the nodes can be synchronized with reclaiming corresponding entries from the persisted metadata log 510.

In at least one embodiment, when a single bucket set from volatile memory is destaged, corresponding entries from the persisted metadata log 510 stored in NVM 503 can also be reclaimed. In at least one embodiment, the destaging of an in-memory metadata log structure (e.g., such as a single bucket set 502) and reclaiming corresponding entries from the persisted metadata log 510 stored in NVM can be done atomically. In at least one embodiment, the metadata log 510 stored on the NVM can be a ring buffer as noted above where new metadata log 510 entries are added to the head and removed from the tail. In such an embodiment, the corresponding entries of the metadata log 510 can be reclaimed by moving the tail of the ring buffer to free the corresponding entries of the ring buffer. In such an embodiment, synchronization between the in-memory metadata logs of the nodes and the persisted metadata log 510 can be maintained so that flushing or destaging an in-memory metadata log in the first phase and reclaiming corresponding entries in the persisted metadata log 510 are done atomically. In particular in at least one embodiment, reinitializing or resetting the in-memory metadata log which has been destaged (e.g., in the first phase) can be performed atomically with movement of the tail of the metadata log 510 to reclaim corresponding entries for the destaged entries of the in-memory metadata log. It should be noted that in embodiments where a single entry of the persisted metadata log can be referenced across multiple bucket sets, the entry of the persisted metadata log cannot be reclaimed until all such references across the multiple bucket sets have been destaged or flushed in the first phase from volatile memory to the BE PDs 542.

Generally, the organization of buckets within a bucket set such as 502 corresponds to a hash table, where the hash function H is used to determine the HV for a MD page M1 having an associated LI, where H(LI)=HV, and where the HV denotes the particular bucket of the bucket set into which to place a metadata update or entry for a metadata update to the MD page M1.

In at least one system, a majority of the metadata updates to the MD pages can be generally random and well distributed across the buckets using the hash function with the bucket sets organized as binary trees. In such a system, the majority of the buckets can be balanced in size due the randomness of the updates and approximately even distribution of the MD page updates among the buckets.

However, there can be particular MD pages, or one or more types of MD pages including particular types of data, where such particular MD pages are updated with a relatively higher frequency or rate than the majority of other MD pages. For example, there can be one or more MD pages that include particular data items such as one or more counters or other metrics that are updated with a high frequency such as with almost every write transaction. For example, the counters can include a first counter denoting a current amount of storage capacity consumed or used. The first counter can denote, for example, the amount of the storage capacity of the BE PDs that are consumed. More generally, the particular MD pages, or type of MD page and data items of such MD pages, that are updated with higher frequency relative to other MD pages can vary with embodiment.

The MD page including the counters can be a frequently updated or high update rate MD page having a much larger number of metadata updates relative to other MD pages. As a result, the bucket corresponding to the MD page with the frequently updated counters or other data items also includes a large number of entries based on the large number of updates to the counters of the MD page.

Several drawbacks can result due to the large number of entries of the bucket associated with the frequently updated MD page, where the drawback can cause an undesirable performance degradation. Generally, operations performed using the bucket having the large number of metadata updates or entries can be expensive and time consuming. For example in at least one embodiment as discussed herein, each bucket of metadata updates can be implemented and organized as a binary tree. Operations performed with respect to the bucket can include, for example, searching the bucket of entries, inserting a new entry for a new metadata update into the bucket or tree, and the like. Operations such as searching the bucket and inserting a new entry into the bucket can be expensive due to the large number of entries of the bucket. Additionally, due to the large number of updates performed to the same MD page, there can be increasingly high contention for access to the same bucket for the MD page and also for the MD page itself. For example, updating the MD page can include acquiring exclusive access, such as by acquiring an exclusive use lock, on the MD page. In this case, the large number of updates to the MD page can result in increased contention for acquiring the necessary exclusive lock. As another example, updating the bucket corresponding to the MD page can include acquiring exclusive access to the bucket by acquiring a spinlock for the bucket. In this case, the large number of updates to the MD page can result in increased contention for acquiring the bucket's spinlock. In at least one system, another drawback can include difficulty in predicting or estimating when the active bucket set is full to trigger destaging.

Accordingly, described in the following paragraphs are techniques that can be used to improve the performance of processing associated with the bucket sets of MD page updates or entries stored in the volatile memory of the nodes. In at least one embodiment, a bucket set can include two subsets of buckets—a first subset of regular buckets and a second subset of custom buckets. The first subset of buckets can be used with MD pages that are not expected to be updated with a high rate or frequency. For example, the first subset of buckets can be used to store metadata updates for MD pages expected to each have approximately the same number or a small number of metadata updates or entries. In contrast, the second subset of buckets can be used to store metadata updates for MD pages expected to have a high rate or frequency of metadata update or entries relative to buckets of the first subset. In at least one embodiment, the second subset can include buckets for MD pages including counters, metrics and/or other data items that are expected to be frequently updated. For example, the counters expected to be frequently updated can include a capacity counter denoting the current amount of consumed storage capacity of BE PDs of the system. In at least one embodiment, the first and second subsets of the same bucket set can have different namespaces and schemas or organizations.

In at least one embodiment, the first subset of buckets of a bucket set can be organized as a hash table. More generally, the buckets of the first subset can use hash-based addressing and can be accessed using a hash function. The hash function H can be used to determine the HV for a MD page M1 having an associated LI, where H(LI)=HV, and where the HV denotes the particular bucket of the bucket set into which to place a metadata update or entry for a metadata update to the MD page M1. The first subset of buckets can be used in connection with MD pages having associated updates that are processed in accordance with a normal or regular line of processing. In contrast, the second subset of buckets can be used in connection with MD pages having associated updates that are processing in accordance with a special, customized or non-regular line of processing.

In at least one embodiment, the second subset of buckets can generally use a non hash-based organization for MD pages expected to be updated at a much higher rate or frequency relative to buckets of the first subset. Generally, the number of entries or updates to MD pages having a corresponding bucket in the second subset can be expected to be much greater than the number of entries or updates to MD pages having a corresponding bucket in the first subset. MD pages having a corresponding bucket in the second subset can sometimes be referred to herein as frequently updated or high update rate (HUR) MD pages. In at least one embodiment, high update rate MD pages can generally be a particular type T of MD page including one or more data items expected to have a high rate of updates. In at least one embodiment, high update rate MD pages can generally include one or more data items expected to have a high rate of updates so that a particular type T of metadata update can denote that the metadata update is made to a data item of a MD page expected to be frequently updated relative to the expected update frequency of other MD pages. For example, in at least one embodiment, one or more specified metadata update types or T types can denote MD pages having a high rate of updates. The T types can denote different allowable type values for the "T" field or item of a tuple as described herein, where the tuple is used to express each metadata update, change or delta made to a MD page in the form of the tuple represented as (LI, EI, T, V). In at least one embodiment, a T type can be defined that denotes a high update rate metadata type associated with a MD page including counters or other values expected to be updated frequently or at a high rate. In at least one embodiment, the second subset of buckets can have an associated structure and organization that allows for efficient access and updating based on the expected frequent or high rate of metadata updates. For example, in at least one embodiment, at least a first bucket in the second subset of buckets can have an associated structure and management processing that facilitates in-place, aggregated updates for counter values of a MD page associated with the first bucket. Providing for in-place aggregated updates to a counter associated with a bucket can thus avoid storing and managing in the bucket multiple entries for multiple updates to the same counter of the high update rate MD page. Generally, the particular structure and management of each particular custom bucket in the second subset of custom buckets can vary and be customized for use in accordance with the particular MD page and its values or data items associated with the particular custom bucket.

In this manner, the techniques of the present disclosure can avoid overloading buckets associated with MD pages that are expected to be updated more frequently relative to other MD pages. Additionally, the techniques of the present disclosure can result in reducing the costs of system resources (e.g., processing time, memory, and/or storage) associated with high rate updated MD pages thereby improving the overall system performance and use of system resources.

The foregoing and other aspects of the techniques of the present disclosure are described in more detail in the following paragraphs.

As discussed above, for example, in connection with FIG. 7A, each bucket set 502, 504 can include buckets organized generally using a hash-based scheme. Each bucket of a bucket set can be associated with a different MD page and can include metadata updates for the associated MD page. In at least one embodiment, the bucket of updates for an associated MD page can be organized as a binary tree of updates. Each of the updates to the MD page can be represented as a tuple stored as an entry in the binary tree or bucket for the MD page. The entries or updates can be organized in the binary tree in time-based order.

In connection with the techniques described in the following paragraphs in at least one embodiment, each bucket set can include both regular buckets and custom buckets. Generally, the buckets of the bucket sets 502, 504 as discussed in connection with FIG. 7A above can be characterized as regular buckets. Additionally in at least one embodiment in accordance with the techniques of the present disclosure, each bucket set can also include custom buckets as discussed below in connection with FIG. 7B.

Figure 7B:
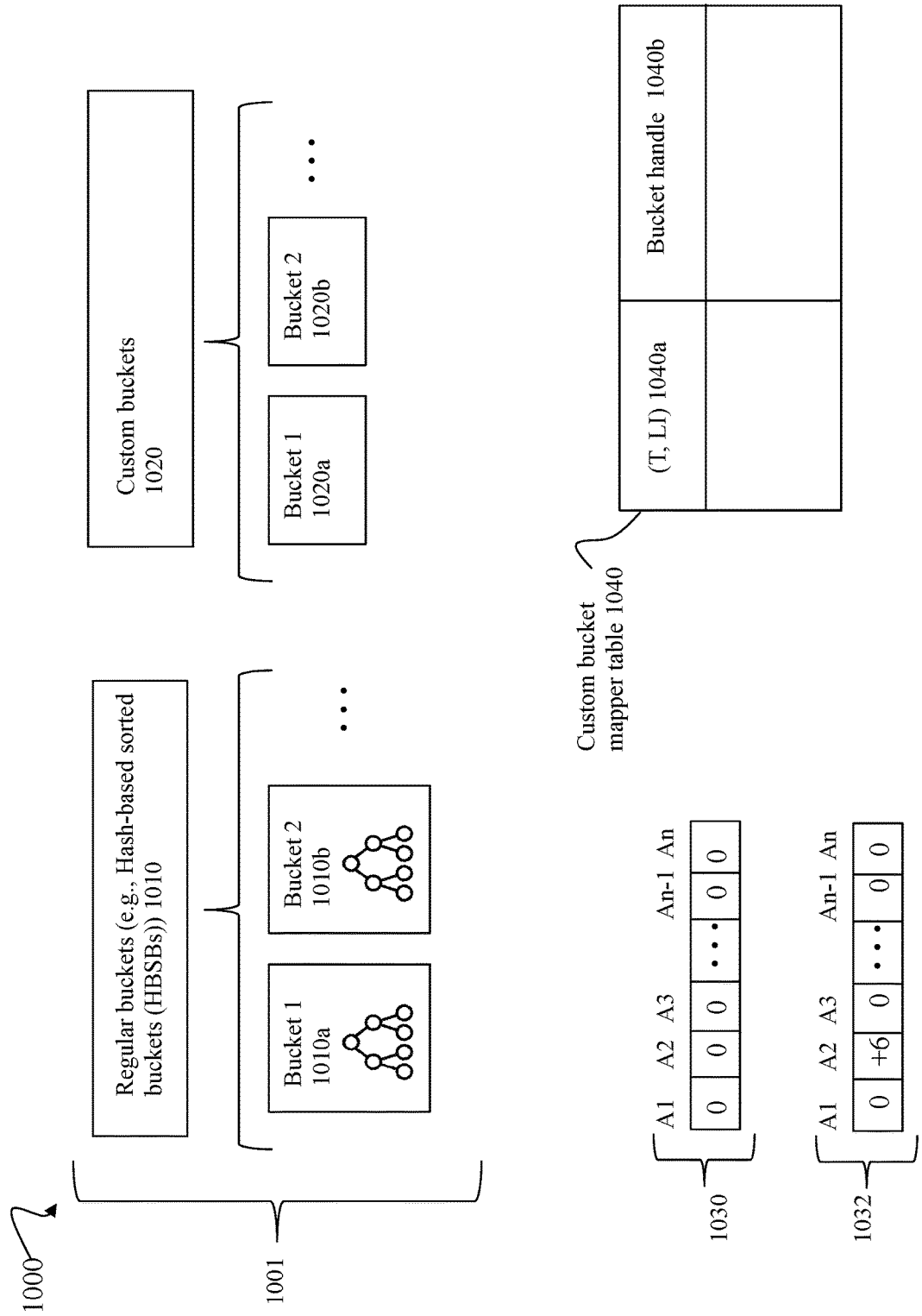
FIGS. 7B and 7D are examples of structures that can be used in at least one embodiment in accordance with the techniques of the present disclosure.

Referring to FIG. 7B, shown is an example 1000 illustrating buckets that can be included in each bucket set and other associated structures in at least one embodiment in accordance with the techniques of the present disclosure.

The example 1000 illustrates that each bucket set, such as 502, 504, can include two subsets of buckets—a first subset of regular bucket 1010 (denoted as regular buckets 1010a, 1010b, and so on) and a second subset of custom buckets 1020 (denoted as custom buckets 1020a, 1020b, and so on). The element 1001, which includes both the regular buckets 1010 and the custom buckets 1020, generally denotes the two subsets of buckets that can be included in each of the bucket sets 502, 504 in at least one embodiment in accordance with techniques of the present disclosure. In at least one embodiment, the regular buckets 1010 can be hash-based sorted buckets (HBSBs) as discussed above in connection with FIG. 7A. The regular buckets 1010 can be addressed and accessed using a hash-based schema as discussed above, and the custom buckets 1020 can be addressed and accessed generally using any suitable non hash-based schema based, at least in part, on the defined metadata update types T of the tuples representing the metadata updates.

In at least one embodiment, metadata types can be defined for MD pages having their metadata updates stored in, or applied to, custom buckets associated with the MD pages. In at least one embodiment, each MD page that is a frequently updated or is a high update rate MD page can have an associated defined T type. Metadata updates to the high update rate MD page can be expressed as tuples, where each such tuple can include a T type denoting the particular type T of the high update rate MD page. In such an embodiment, a frequently updated or high update rate MD page having an associated T type can have its metadata updates stored in, or applied to, one of the custom buckets associated with the frequently updated or high update rate MD page. Generally, the custom bucket associated with the frequently updated or high update rate MD page can be customized to have a structure and organization that is efficient and optimized for use with the particular entries, data items or fields of the high update rate MD page that is modified. For example in at least one embodiment, one or more MD pages can include various counters that are frequently updated. In at least one embodiment, the one or more MD pages can each include a specified number of counters and can each have the same defined layout and structure. In at least one embodiment, each of the MD pages of counters can also be associated with a different custom bucket having a defined layout and structure optimized for use in storing and/or applying updates to the counters in place in an aggregated manner. Each counter of the MD page can have a corresponding entry, field or data item in the custom bucket, where the current value of the corresponding entry, field or data item of the custom bucket denotes a current value of the aggregated updates applied to the counter. In one aspect, the current value of the entry in the custom bucket can denote a net change in the associated counter due to the collective application of updates applied to the value recorded in the custom bucket. For example, 3 updates represented by 3 tuples can be made to the counter, where each of the 3 updates can increase the counter by +2, and where the aggregated or collective change to the counter is +6. In this case, the entry of the custom bucket associated with the counter can include a value of +6. As discussed in more detail below, when the custom bucket associated with the high update rate MD page is destaged, an existing stored value for the counter can be read from the MD page as persistently stored in the MD page store, a new or revised value for the counter can be determined by incrementing the existing stored value of the counter by 6 as denoted by the entry in the custom bucket, and the new or revised value for the counter can be stored or written to the MD page store.

In this manner, the in-place updates reflected by the aggregated value of the entry denotes the updates applied to the corresponding counter of the high update rate MD page. As a result, the amount of the volatile memory 501 of each node consumed to store and track the metadata updates to the MD page can be reduced. Generally, use of the aggregated values denoting multiple updates applied to the counters of the MD page can be performed in accordance with the custom bucket for the particular type of data items (e.g., counters) of the MD page that are updated.

Referring to the element 1030 of FIG. 7B, shown is a representation of entries, fields or data items of a custom bucket associated with a high update rate MD page of counters as just discussed above. The element 1030 indicates that the custom bucket includes "N" entries corresponding respectively to "N" counters of the high update rate MD page, where initially all counters can have a value of 0. The custom bucket 1030 can be created (e.g., allocated) and initialized, for example, the first or initial time there is an update made to any counter of the associated MD page. More generally, the custom bucket 1030 can be create and initialized the first or initial time an update is applied to any entry, field or data item of the custom bucket 1030. As discussed above, the MD page can have 3 updates represented by 3 tuples made to one of the counters C2 having a corresponding entry A2 in the custom bucket denoted by 1030, where the 3 updates result in a net or aggregated change of +6 to C2. As a result, after processing the 3 updates to C2, the corresponding entry A2 can have a value of +6 as denoted in the element 1032 representing the custom bucket 1030 that has been updated after the 3 updates to the counter C2 are processed.

In at least one embodiment, a high update rate MD page having an associated custom page can also have an associated type T included in the set of predefined allowable types T of tuples representing metadata updates. In at least one embodiment, the type T associated with a high update rate MD page can denote the particular structure and layout of the MD page. Accordingly in such an embodiment, two MD pages having the same type T can have the same structure and layout, and can also have corresponding custom buckets with the same structure and layout. For example, a first type T1 can denote MD pages and associated custom buckets having a first structure and layout, and a second type T2 can denote MD pages and associated custom buckets having a second structure and layout. MD pages M11, M12 and M13 can be of the first type T1; and MD pages M21, M22 and M23 can be of the second type T2. MD pages of the first type T1 can have a first number of counters, such as 100 each of a particular size (e.g., number of bytes or bits). MD pages of the second type T2 can have a second number of counters, such as 4 each of a particular size (e.g., number of bytes or bits). First custom buckets can be associated with the MD pages M11, M12 and M13 of the first type T1, where each of the first custom buckets includes 100 entries, fields or data items corresponding respectively to the 100 counters of each of the MD pages M11, M12 and M13 of the first type T1. Second custom buckets can be associated with the MD pages M21, M22 and M23 of the second type T2, where each of the second custom buckets includes 4 entries, fields or data items corresponding respectively to the 4 counters of each of the MD pages M21, M22 and M23 of the second type T2.

In at least one embodiment, multiple high update rate MD pages can also be associated with the same custom bucket where the multiple high update rate MD pages can have the same MD type T. In this case, the single custom bucket can generally be a structure having different portions that correspond to the different multiple high update rate MD pages.

More generally, the custom buckets 1020 can include custom buckets of multiple different defined types T. Custom buckets of values denoting net aggregated changes to counters are one example illustrating a customized bucket structure and layout that can be used in an embodiment in accordance with the techniques of the present disclosure. Additionally, customized or specialized processing can generally be performed in connection with creating a custom bucket, storing and/or applying metadata updates to the custom bucket, and destaging updates from the custom bucket. Thus, the particular processing performed in connection with each custom bucket can vary.

Generally, the custom buckets 1020 can be associated with MD pages having updates which require non-regular, specialized or customized processing. In at least one embodiment, the custom buckets 1020 can include custom buckets associated with frequently updated or high update rate MD pages.

In at least one embodiment, a custom type list can be maintained which includes all types T of MD pages whose associated updates need non-regular, specialized or customized processing. Generally, the predefined types denoting allowable values for T in tuples representing metadata updates can include one of the types of the custom type list, as well as other allowable types some of which are described elsewhere herein.

In at least one embodiment, a bucket handle of a custom bucket associated with a MD page having an associated type T included in the custom types list can be determined based, at least on part, on the value for T of the MD page. In at least one embodiment for a tuple TP=(LI, EI, T, V) representing a metadata update to a MD page, where the MD page has the associated type T as in the TP and where the type T is included in the custom types list, the bucket handle of the custom bucket associated with the MD page can be determined based, at least on part, on the value for T of the tuple and the LI of the tuple. In at least one embodiment, the value of EI of the tuple can be used to determine a corresponding entry, field or data item of the custom bucket associated with the metadata change.

In at least one embodiment for a tuple TP=(LI, EI, T, V) representing a metadata update to a MD page, where the MD page has the associated type T as in the TP and where the type T is included in the custom types list, the bucket handle of the custom bucket associated with the MD page can be determined generally as a function F of the value for T of the tuple and the LI of the tuple, represented as F(T, LI). The function F can generally denote a mapping between a custom bucket and associated MD page of a custom type T included in the custom types list. In one embodiment, a custom buckets mapper table 1040 can be used and maintained as part of additional metadata associated with each bucket set. The custom buckets mapper table 1040 can map a particular combination of values for LI and T (1040a) of a tuple representing a metadata change to a MD page to a corresponding custom bucket which has an associated bucket handle (1040b) and which is included in the custom buckets 1020 of a bucket set. In connection with the LI and T of the tuple denoting an update to a MD page M, the MD page M can be uniquely identified by the LI of the tuple and the MD page M can be the type T in the tuple. The custom buckets mapper table 1040 can also include other information than as illustrated in FIG. 7B depending on the particular information needed to manage the custom buckets of the bucket set 1020. For example, the custom buckets mapper tale 1040 can also include other information about the custom buckets 1020 such as, for example, the size of each custom bucket, how many custom buckets are currently included in the custom bucket subset 1020, and the like.

In at least one embodiment, the custom mapper table 1040 and the bucket set including the custom buckets 1020 and the regular bucket 1010 can be allocated from the same pool of volatile memory. In this manner, the volatile memory of the single pool used to allocate memory for the structures 1040, 1010 and 1020 can be reclaimed together when destaging has completed for MD updates of 1010 and 1020. With reference back to FIG. 7A and also with reference to FIG. 7B, there are two bucket sets 502, 504 each including a first subset of regular buckets 1010 and a second subset of custom buckets 1020. At any point in time, one of the bucket sets 502, 504 can be the active bucket set and the remaining other bucket set can be the inactive bucket set. Generally, a first chunk or pool of volatile memory can be used to allocate memory for a first of the two bucket sets 502, 504 as well as other associated structures such as the custom mapper table used with custom buckets of the first bucket set; and a second chunk or pool of volatile memory can be used to allocate memory for the remaining second of the two bucket sets 502, 504 as well as other associated structures such as the custom mapper table used with custom buckets of the remaining second bucket set.

Figure 7C:
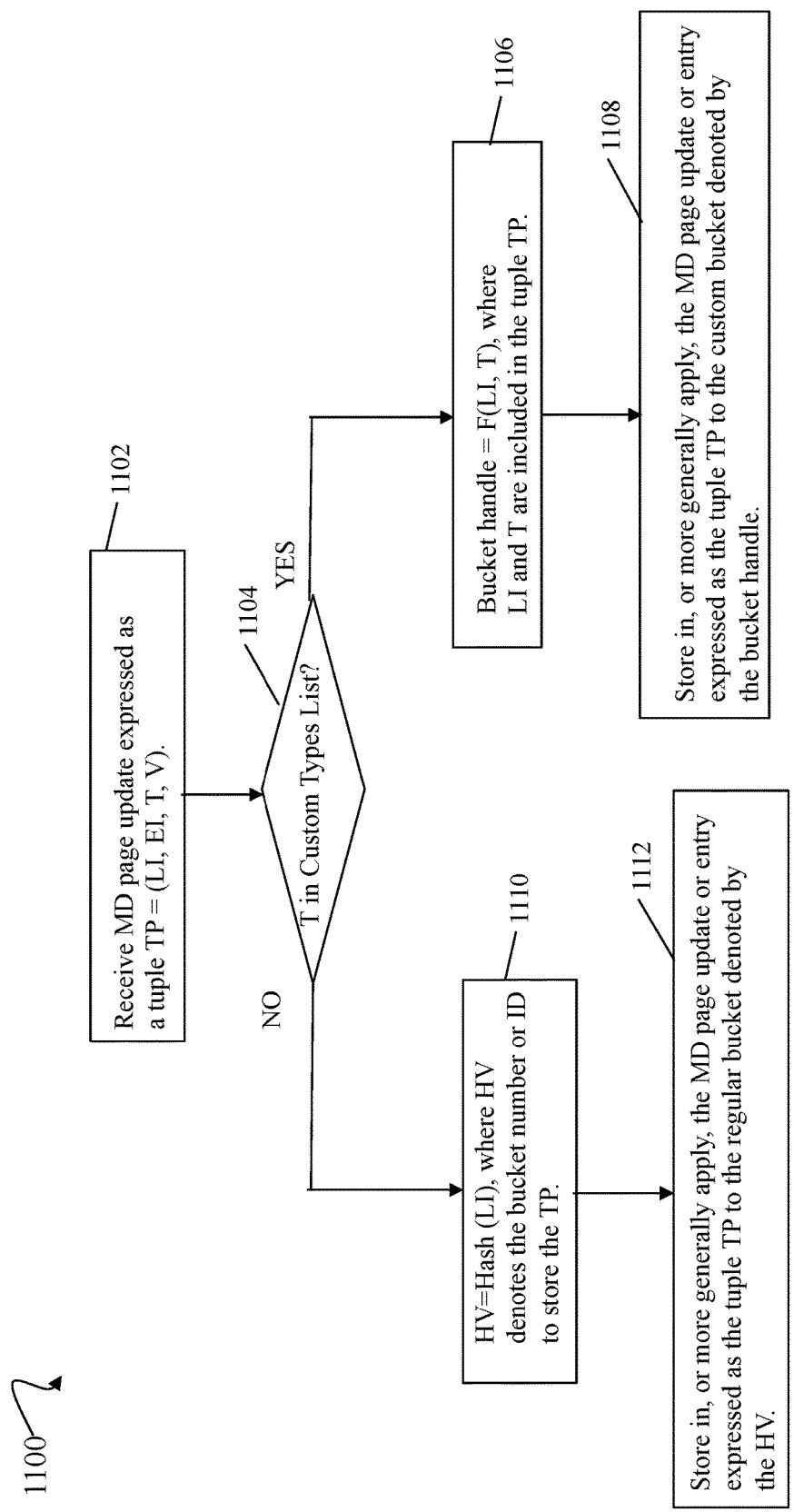
FIGS. 7C, 8, 9A, 9B and 10 are flowcharts of processing steps performed in at least one embodiment in accordance with the techniques of the present disclosure.

Referring to FIG. 7C, shown is a flowchart 1100 of processing that can be performed in an embodiment in accordance with the techniques of the present disclosure. The steps of the flowchart 1100 describe processing that can be performed in connection with a received MD page update expressed as a tuple=(LI, E1, T, V) using a bucket set including both regular buckets 1010 and custom bucket 1020 as described in connection with FIG. 7B.

At the step 1102, the MD page update expressed as a tuple TP=(LI, EI, T, V) can be received. From the step 1102, control proceeds to the step 1104. At the step 1104, a determination can be made as to whether the type T of the tuple is included in the custom types list. If the step 1104 evaluates to no, where it is determined that the type T of the tuple is not included in the custom types list, control proceeds to the step 1110. If the step 1104 evaluates to no, it means that the MD page update does not need non-regular, specialized or customized handling. Rather it means that the MD page update can be handled using normal or regular processing workflow where control proceeds from the step 1104 to the step 1110. At the step 1110, processing can be performed to determine a bucket handle for a regular bucket of the subset 1010. In at least one embodiment as discussed above, the bucket handle identifying the regular bucket in which to store the MD page update received in the step 1102 can be a hash value HV determined using the hash function, Hash, based at least in part on the LI of the tuple. Thus, HV=hash (LI) can denote the bucket handle of a regular bucket in which to store the MD update expressed by the tuple TP of the step 1102. The HV can denote, for example, the bucket number or identifier (ID) of a regular bucket in which to store the TP. From the step 1110, control proceeds to the step 1112. At the step 1112, processing can be performed to store in, or more generally apply, the MD page update expressed as the TP (received in the step 1102) to the regular bucket denoted by the HV.

If the step 1104 evaluates to yes, it means that the MD page update needs non-regular, specialized or customized handling and control proceeds from the step 1104 to the step 1106. At the step 1106, processing can be performed to determine a bucket handle for a custom bucket of the subset 1020. In at least one embodiment as discussed above, the bucket handle identifying the custom bucket in which to apply the MD page update received in the step 1102 can be determined as a function of LI and T of the tuple TP (e.g., bucket handle=F(LI, T)). In at least one embodiment, the custom bucket mapper table 1040 of FIG. 7B can be used to map the LI and T of the TP to a corresponding bucket handle of a custom bucket of 1020. Generally, the bucket handle of the custom bucket can be, for example, an ID, number, pointer (e.g., address) or reference to the custom bucket to which the MD update expressed as the tuple TP is applied. From the step 1106, control proceeds to the step 1108. At the step 1108, processing can be performed to store in, or more generally apply, the MD page update expressed as the tuple TP (e.g., receive in the step 1102) to the custom bucket denoted by the bucket handle (e.g., determined in the step 1106).

In at least one embodiment where the high update rate MD page includes counters and the corresponding custom bucket for the MD pages is an array or vector of integer entries, fields or data items as described in connection with the elements 1030, 1032 of FIG. 7B, the V value of the tuple denoting an update to a counter can denote the amount of change with respect to a current value of the counter as stored in the MD page store. For a positive value V>0, V denotes an increment to the counter value; and for a negative value V<0, V denotes a decrement to the counter value.

It should be noted that a frequently updated or high update rate MD page is one example of a MD page that can require special customized processing for metadata updates and can have an associated custom bucket of 1020 included in a bucket set comprising 1010 and 1020 as in FIG. 7B.

A MD page designated as a high update rate MD page having an associated custom bucket of 1020 rather than a regular non-highly updated MD page having an associated regular bucket of 1010 can be determined in any suitable manner. In at least one embodiment, a MD page can be designated as a high update rate MD page expected to have a high rate or large number of updates. For example, a MD page can be expected to have a high rate or large number of updates based on prior observed runtime behavior such as the number of updates or entries in a defined time period for the MD page relative to other non-highly updated MD pages. A MD page can be expected to have a high rate or large number of updates based on the expected runtime or execution of code paths that access the MD page. For example, the counters of the MD page tracking various metrics can be updated at various times in connection with various operations. A counter tracking the amount of consumed physical BE PD storage can be updated with each operation that can increase or decrease the amount of consumed BE storage. Such operations can include, for example, a write or other operation resulting in allocating additional BE PD storage for storing new user data; an operation that deletes one or more storage objects or entities (e.g., deletes a LUN, snapshot, and the like); and/or an operation the creates, expands or provisions storage for one or more storage objects or entities.

In at least one embodiment, a high update rate MD page having an associated custom bucket of the second subset 1020 of FIG. 7B can have an expected update rate or frequency exceeding a specified threshold, where updates to the high update rate MD page are processed in accordance with customized or special processing due to the large number of updates to the MD page. In at least one embodiment, if a MD page is not designated as a high update rate MD page, the MD page can be characterized as a non-highly updated MD page where updates to the MD page are performed in accordance with normal or regular processing by storing the updates as tuples in a bucket of the first subset 1010 of FIG. 7B. In at least one embodiment, a high update rate MD page can have an update rate or frequency (e.g., number of updates in a defined time period) that generally exceeds the average rate or frequency of other non-highly updated MD pages by a specified amount, tolerance or threshold. For example, a high update rate MD page can have an expected update rate or frequency that exceeds a number of specified standard deviations (e.g., for example 2 standard deviations) with respect to the average update rate or frequency across all MD pages.

In at least one embodiment in which the custom bucket is a bucket of values associated with a MD page of counters as discussed above (e.g., elements 1030, 1032 of FIG. 7B), an update to an entry, field or data item of the custom bucket (e.g., array of values) can be done using a shared lock on the MD page and also using either a dedicated custom bucket spinlock or an atomic operation. To illustrate, consider a case where two worker threads W1 and W2 each want to update the same counter in a MD page. Assume that the updates to the counter are represented using in-place updates to a single value in the custom bucket associated with the MD page. Consistent with other discussion herein, the single value at a point in time can denote the collective aggregated net change to the counter as a result of applying multiple updates up to the point in time. In this manner, the net result to the counter and order in which the threads W1 and W2 perform their respective increment and/or decrement may not be important. Both W1 and W2 can hold a shared lock on the MD page. Then both W1 and W2 can each update the corresponding value in the custom bucket associated with the counter atomically using either an atomic update operation or a dedicated custom bucket spinlock, depending on what is supported in a particular embodiment. In at least one embodiment, the foregoing shared MD page lock and either the atomic update operation or dedicated custom bucket spinlock can be used since the order in which the updates are performed may not matter and does not change the final value or net change to the counter. In such an embodiment, updating the entry of the custom bucket denoting the net change to the counter can be performed by multiple threads without requiring the threads to each acquiring a write lock or an exclusive access lock on the MD page having the counter that is updated.

Shared locks or read locks, exclusive locks or write locks, spinlocks and atomic update operations are generally known in the art. A shared lock or read lock on the MD page allows multiple simultaneous readers to read from the same MD page. When read lock or shared lock on the MD page is held by W1 and W2, no thread can acquire a write lock or exclusive access lock on the MD page. Each thread W1 and W2 holding the shared MD page lock can perform the update to an entry of the bucket associated with the counter atomically, such as using an atomic increment or decrement operation. Alternatively, each thread W1 and W2 can perform the counter update while the thread holds the shared lock or read lock on MD page and also acquires or holds a spinlock on the custom bucket including the entry of the bucket which is updated. Generally, an atomic operation, such as an atomic increment operation, includes atomically performing a read-modify-write with respect to the entry being updated so that the value of the entry cannot be modified between the instant its value is read and the moment it is modified. In connection with the entry of the custom bucket, the atomic read-modify-write to either increment or decrement (or more generally update) the current value of the entry includes atomically performing the following in sequence: reading the current counter value of the entry from bucket, modifying the counter value read from bucket to obtain a result or updated counter value, and storing the updated counter value in the entry of the bucket.

Note that in cases where atomicity and also the time order in which the updates to the counter (e.g., updates to the entry of the custom bucket) are performed by the threads W1 and W2 are important, W1 and W2 can alternatively use a different technique to update the entry of the custom bucket. For example, each of W1 and W2 can acquire and hold a more expensive MD page exclusive lock when updating the entry of the custom bucket so as to exclude or block all other threads from accessing the MD page and also guarantee time ordering.

As discussed above, for example, in connection with the elements 1030 and 1032 of FIG. 7B, a value or counter value in an entry of the custom bucket can denote an aggregated relative increment or decrement applied to a stored value of the counter on the BE PDs in order to obtain a most current up to date value of the counter. In connection with such an embodiment where the custom bucket 1030 is an array of entries of counter values corresponding to different counters, the entries of counter values of the custom bucket 1030 can be initialized to 0 when the custom bucket is initially created or allocated. Subsequently, the counter values of the array or bucket 1030 can then incremented or decremented in accordance with the MD updates of the associated counters. In this case, a counter value of an entry of the custom bucket 1030 can be an aggregated integer value denoting the relative increase or decrease with respect to the current counter value as stored on the BE PDs. When the counter value of the bucket is destaged, it can be applied to current counter value of the MD page as stored on the BE PDs. For example, for the counter C1, assume a counter value of +10 is stored in a custom bucket for MD page P1 which includes the counter C1. The counter value of +10 can denote an aggregated relative increment or decrement applied to the current value of C1 as stored on the BE PDs. Assume further, for example, that C1, as included in the stored version of the MD page P1 on the BE PDs, has a value of +5. When destaging the custom bucket, processing performed can include reading the current value of C1 from the stored version of the MD page P1 on the BE PDs and applying the counter value of +10 as included in the customer bucket for the counter C1. In this case, destaging the counter value of +10 includes reading the current value of C1=+5 from the BE PDs, applying (e.g., adding) the counter value of +10 to the current value of C1=+5, and persistently storing the resulting value of +15 as the new, updated, latest value of C1 of the MD page P1 on the BE PDs.

In at least one embodiment as described herein, destaging of the MD page updates can be performed to apply the MD updates to corresponding MD pages as stored in the MD page store 540, or more generally persistently stored on non-volatile storage of the BE PDs. In connection with discussion herein regarding a first phase of destaging of bucket sets from volatile memory 501 to the BE PDs 542, both the regular buckets 1010 and the custom buckets 1020 of the bucket sets can be destaged and stored on the BE PDs 542. In connection with discussion herein regarding a second phase of destaging of bucket sets from 524 of the BE PDs 542, MD updates stored in regular buckets can be aggregated and consolidated into merge sets 532 which are then applied to generate updated corresponding MD pages stored in the MD page store 540 as discussed in connection with FIG. 7A. Additionally, in the second phase of destaging of bucket sets from 524 of the BE PDs 542, MD updates of the custom buckets can be similarly aggregated and consolidated into merge sets which are then applied to generate updated corresponding MD pages stored in the MD page store 540.

Figure 7D:
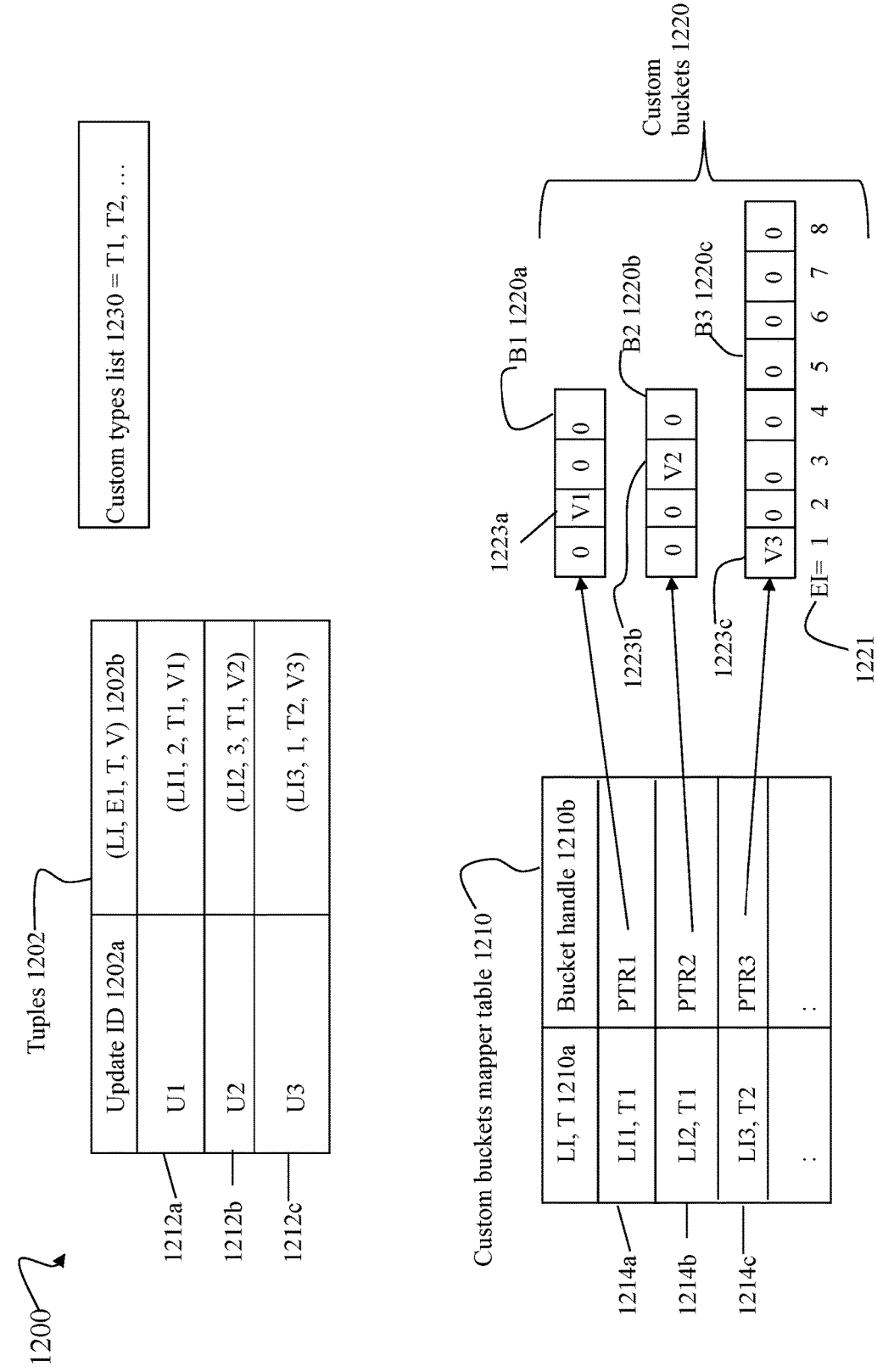

Referring to FIG. 7D, shown is an example 1200 illustrating use of the techniques of the present disclosure in at least one embodiment. The example 1200 is generally a more detailed example illustrating the use of the custom buckets 1220, the tuples 1202 and the custom buckets mapper table 1210 in at least one embodiment.

The tuples 1202 can denote 3 MD page updates to 3 different MD pages uniquely identified, respectively, by the following 3 associated LIs: LI1, LI2 and LI3. The tuples 1202 includes the tuples 1212a-c denoting respectively the 3 MD page updates U1, U2 and U3 (1202a) represented by the tuples in the column 1202b. The row 1212a indicates that the update U1 is represented by the tuple (LI1, 2, T1, V1). The row 1212b indicates that the update U2 is represented by the tuple (LI2, 3, T1, V2). The row 1212c indicate that the update U3 is represented by the tuple (LI3, 1, T2, V3).

The custom types list 1230 can include T1 and T2 denoting types of high update rate MD pages for which non-regular customized processing can be performed. In this example 1200, T1 can denote a MD page type having an associated custom bucket with 4 entries, fields or data items of a specified number of bytes; and T2 can denote a MD page type having an associated custom bucket with 8 entries, fields or data items of a specified number of bytes.

The custom buckets 1220 can include the buckets 1220a-c. In this example 1200, the custom buckets 1220a-c can denote arrays of counter values used to perform in-place aggregated updates as described, for example, in connection with the FIGS. 7B and 7C.

The custom buckets mapper table 1210 includes a first column 1210a of different pairs of values for LI and T which are mapped to corresponding bucket handles of column 1210b. The row 1214a indicates that the pair values (LI1, T1) (1210a) is mapped to the bucket handler PTR1 (1210b) which points to, or references, the custom bucket B1 1220a. The row 1214ab indicates that the pair values (LI2, T1) (1210a) is mapped to the bucket handler PTR2 (1210b) which points to, or references, the custom bucket B2 1220b. The row 1214c indicates that the pair values (LI3, T2) (1210a) is mapped to the bucket handler PTR3 (1210b) which points to, or references, the custom bucket B3 1220c.

As described in connection with the processing of FIG. 7C and denoted by the row 1212a, the update U1 can be received as represented by the tuple (LI1, 2, T1, V1).

Processing determines that the type T1 of U1 is on the custom types list 1230 thereby indicating that U1 is an update to a MD page, such as a high update rate MD page, associated with a custom bucket. In this case, the update U1 can be applied to the custom bucket associated with the MD page having the LI=LI1. The custom buckets mapper table 1210 is consulted to map (LI1, T1) of the tuple U1 to its associated bucket handler PTR1 of the row 1214a. The PTR1 points to, or references, the custom bucket B1 1220a where U1 is applied to the custom bucket B1 1220a. In this example, U1 represented by the tuple (LI1, 2, T1, V1) indicates that the counter associated with EI=2 in the custom bucket B1 1220a is incremented by the value V1. EI=2 of the tuple for U1 can denote that the second entry, data item or field of the bucket B1 1220a is to be updated by incrementing the current value by +V1. In this example, assume that all of the custom buckets 1220a-c have entries initialized to 0 prior to applying any of the updates U1-U3 1212a-c. Applying the update U1 to the second entry of the bucket B1 1220a results in storing the value V1 in the entry 1223a.

As described in connection with the processing of FIG. 7C and denoted by the row 1212b, the update U2 can be received as represented by the tuple (LI2, 3, T1, V2). Processing determines that the type T1 of U2 is on the custom types list 1230 thereby indicating that U2 is an update to a MD page, such as a high update rate MD page, associated with a custom bucket. In this case, the update U2 can be applied to the custom bucket associated with the MD page having the LI=LI2. The custom buckets mapper table 1210 is consulted to map (LI2, T1) of the tuple U2 to its associated bucket handler PTR2 of the row 1214b. The PTR2 points to, or references, the custom bucket B2 1220b where U2 is applied to the custom bucket B2 1220b. In this example, U2 represented by the tuple (LI2, 3, T1, V2) indicates that the counter associated with EI=3 in the custom bucket B2 1220b is incremented by the value V2. EI=3 of the tuple for U2 can denote that the third entry, data item or field of the bucket B2 1220b is to be updated by incrementing the current value by +V2. Applying the update U2 to the third entry of the bucket B2 1220b results in storing the value V2 in the entry 1223b.

As described in connection with the processing of FIG. 7C and denoted by the row 1212c, the update U3 can be received as represented by the tuple (LI3, 1, T2, V3). Processing determines that the type T2 of U3 is on the custom types list 1230 thereby indicating that U3 is an update to a MD page, such as a high update rate MD page, associated with a custom bucket. In this case, the update U3 can be applied to the custom bucket associated with the MD page having the LI=LI3. The custom buckets mapper table 1210 is consulted to map (LI3, T2) of the tuple U3 to its associated bucket handler PTR3 of the row 1214c. The PTR3 points to, or references, the custom bucket B3 1220c where U3 is applied to the custom bucket B3 1220c. In this example, U3 represented by the tuple (LI3, 1, T2, V3) indicates that the counter associated with EI=1 in the custom bucket B3 1220c is incremented by the value V3. EI=1 of the tuple for U3 can denote that the first entry, data item or field of the bucket B3 1220c is to be updated by incrementing the current value by +V3. Applying the update U3 to the third entry of the bucket B3 1220 results in storing the value V3 in the entry 1223c.

In at least one embodiment, callbacks can be specified and invoked in connection with performing desired processing at different workflow processing points for different custom buckets of different T types. A user or developer provided code module can be invoked using a callback mechanism which generally associates or links the user specified routine or code module (or more generally sometime referred to as a code entity) with a corresponding processing point in the workflow performed for custom bucket processing. For example, in at least one embodiment, a defined interface or API (application programming interface) can be used to specify the associated linkages between the workflow processing points and corresponding user provided or developer provided code modules, routines or bodies of code which are invoked at the workflow processing points to perform customized processing for the custom buckets. For example in at least one embodiment, an API can be used to make a call into infrastructure code where parameters of the API identify the association or runtime linkage between a particular user provided code module or routine and a corresponding workflow processing point. The infrastructure code can be existing code of a system that implements the techniques of the present disclosure.

The API call can be made from user or developer code to the infrastructure code to define and establish the necessary runtime linkages between the workflow processing points for the custom buckets and the user provided code modules or routines which perform the necessary workflow processing. The particular syntax and semantics of the API can vary with implementation such as, for example, can vary with the particular coding or programming language used. For example, the API can specify to invoke a user provided code module or routine, "routine1", at workflow point 1, to perform processing for a particular operation on a custom bucket of a particular type T. In this manner in at least one embodiment, the user provided code, "routine1", can be a callback routine or function where the name, a reference or a pointer to the user provided code, "routine1", can be passed as an argument in the defined API, and where the callback routine or function "routine1" is subsequently invoked or called by the infrastructure code at an appropriate associated workflow processing point. In one embodiment in accordance with the techniques of the present disclosure, the foregoing API can be used to generally register the callback routine or function with a particular workflow processing point. More specifically, the foregoing API can be used to register the association between the callback routine or function and a corresponding workflow processing point at which the callback routine or function is later invoked by the infrastructure code.

In at least one embodiment, each workflow processing point can be associated with one or more callbacks or code entry points to the different user or developer provided code modules, routines or bodies of code. At runtime, the infrastructure code executes and can control or drive the workflow processing and can also invoke the user or developer provided code modules, routines or bodies of code at different workflow processing points. For example, a first user provided routine can be associated with a first workflow processing point. The infrastructure code executes and, at the first workflow processing point, transfers control to the first user provided routine to execute code of the first user provided routine. Once the first user provided routine has completed execution, runtime control can transfer back to the infrastructure code to continue with the workflow processing and additionally invoke any user provided code modules or routines which are associated with corresponding subsequent workflow processing points.

To further illustrate, a set of per-MD type callbacks can be specified for a single T type denoting a particular type T of MD page that is a high rate update MD page, where the set can include:

1. A creation bucket callback that performs processing to create and initialize the custom bucket associated with a MD page of the particular T type.

2. An update bucket callback that performs processing to update the custom bucket associated with a MD page of the particular T type.

3. A destaging bucket callback that performs processing to destaged the custom bucket associated with a MD page of the type T.

In at least one embodiment, the creation bucket callback can be invoked by the infrastructure code at the appropriate workflow processing point to create a custom bucket associated with a MD page M1 of the type T, for example, the first or initial time there is an update to a counter or other data item of the MD page M1. In at least one embodiment, the update bucket callback can be invoked by the infrastructure code at the appropriate workflow processing point to update a counter or other data item of the MD page M1, and where the counter or other data item has a corresponding field in the custom bucket that is updated. In at least one embodiment, the destaging bucket callback can be invoked by the infrastructure code at the appropriate workflow processing point to destage a custom bucket of the type T associated with the MD page M1.

For example, consider a MD page M1 of type T1 having counters discussed herein having an associated custom bucket. Each counter of the MD page M1 can have a corresponding counter (e.g., entry or field) in the custom bucket. The creation bucket callback for the type T1 can, for example, create the custom bucket by allocating memory for the custom bucket from a memory pool associated with the active bucket set; and then can subsequently initialize all counters of the custom bucket. The creation bucket callback can be invoked, for example, in response to receiving the first or initial update to any counter of the associated MD page M1. The update bucket callback for the type T1 can be invoked, for example, to store and/or apply an update to one of the counters of the associated MD page M1. For an update to a counter C1 of the MD page M1, the update bucket callback can, for example, update a particular entry or field of the custom bucket associated with the MD page M1, where the field or entry denotes a counter value and corresponds to the updates or changes to the counter C1 as stored in the custom bucket. In at least one embodiment, the particular entry or field and the particular counter C1 of the MD page M1 to be updated can be determined, at least in part, by the update bucket callback using the EI value of the tuple representing the metadata change or update to the particular counter C1. In at least one embodiment, the V value of the tuple representing the metadata change or update to the particular counter C1 can denote a relative amount by which C1 is increased (e.g., if V is positive) or decreased (e.g., if V is negative). In this manner, the V value of the tuple can denote one of the updates to the counter C1 aggregated into a current value representing collective multiple updates to the counter C1, where the current value can be stored in the field or entry of the custom bucket corresponding to the counter C1. The destaging bucket callback for the type T1 can, for example, destage the custom bucket of counter values for the MD page of the type T1. For example, the destaging callback can perform processing including: reading a stored version of the MD page M1 from the MD page store, or more generally, the BE PDs (e.g., read the stored version of the MD page M1 into a memory buffer); applying the counter values of the custom bucket to corresponding counter values for the stored version of the MD page M1 (e.g., applying the counter values of the custom bucket to corresponding stored versions of counters as stored in the memory buffer) thereby resulting in an updated version of the MD page M1; and persistently storing the updated version of the MD page M1 in the MD page store, or more generally, the BE PDs (e.g., writing the updated version of M1 as included in the memory buffer out to the MD page store).

In at least one embodiment, the set of callbacks associated with each of the different MD page types T designated as a high update rate MD page type can be stored in any suitable structure such as, for example, the custom buckets mapper structure. When the infrastructure code determines that an action corresponding to one of the callbacks is to be performed at a particular workflow processing point, the infrastructure code can invoke the appropriate one of the callbacks associated with the particular workflow processing point.

In this manner in at least one embodiment, a callback mechanism can be used to encapsulate processing performed for different operations for one or more custom buckets of a particular MD type T where the MD type T can denote a particular type of MD page.

What will now be described are techniques that can be used in connection with servicing I/Os and reads and writes with respect to metadata of a MD page.

The techniques described in the following paragraphs provide for reading one or more MD pages, or portions thereof. Consistent with other discussion herein, a node can receive an I/O operation, such as a read I/O operation, that reads user data from a target logical address, such as from a LUN and an LBA or offset on the LUN. In connection with processing or servicing the read I/O operation, the node can read metadata from one or more MD pages to obtain the requested read data. The one or more MD pages can be used, for example, to map the target logical address to the corresponding physical storage location of the requested read data. The node can receive an I/O operation, such as a write I/O operation, that writes user data to the target logical address. In connection with processing or servicing the write I/O operation, the node may also need to read metadata from one or more MD pages.

Figure 8:
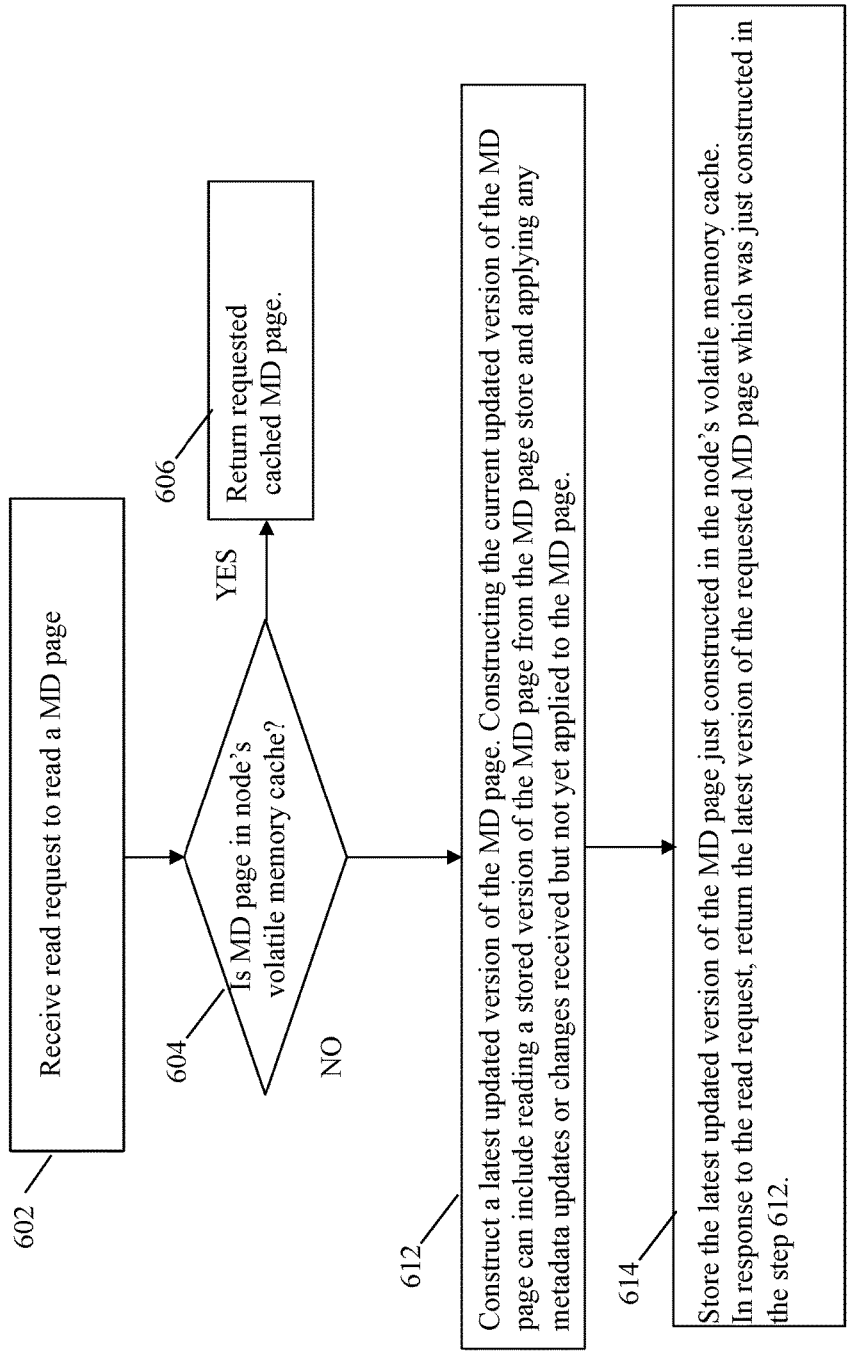

Referring to FIG. 8, shown is a flowchart 600 of processing steps that can be used in connection with servicing a read request to read metadata from a MD page.

At the step, 602 a node may receive a read request for a MD page. From the step 602, control proceeds to the step 604.

At the step 604, a determination is made as to whether the MD page is currently stored in the node's volatile memory cache. If the step 604 evaluates to yes, a read cache hit is determined with respect to the requested MD page. If the step 604 evaluates to no, a read cache miss is determined with respect to the MD page and read cache miss processing can be performed. If the step 604 evaluates to yes, control proceeds to the step 606.

At the step 606, processing is performed to return a response to the read request received in the step 602. Processing of the step 606 can include retrieving the requested MD page from the node's local volatile memory cache MD, and returning the requested MD page in response to the read request.

If the step 604 evaluates to no, control proceeds to the step 612. At the step 612, processing can be performed to construct the latest version of the requested MD page. Constructing the current version of the MD page C1, where C1 can denote the LI of the current MD page, can include determining whether the bucket C1 in the currently active bucket set includes any entries or tuples which generally require further processing or resolution before the current MD page C1 can be constructed. If there are no such entries or tuples requiring further processing or resolution before constructing C1, then the step 604 can include reading a stored version of the MD page from the MD page store of the BE PDs, and applying any metadata updates or changes received but not yet applied to the MD page. The metadata updates for the MD page can be aggregated from the in-memory or volatile memory structures of the node's volatile memory 501 (e.g., the in-memory metadata log from the bucket sets 502, 504 of the volatile memory 501 of the nodes) and also from the BE PDs 542. In particular, the metadata updates for the MD page can be aggregated and merged from the bucket sets 502 and 504 (e.g., the node's in-memory metadata log), and also from the destaged bucket sets 524. The metadata updates for the particular MD page can be retrieved based on the LI uniquely associated with the MD page, where the LI is mapped uniquely to a particular bucket in each of the bucket sets 502, 504, and each of the bucket sets of 524. Consistent with other discussion herein, the metadata updates for the MD page can be aggregated and merged. A stored version of the MD page can be retrieved from the MD page store 540, and the merged metadata updates from the MD page can then be applied to the stored version of the MD page to thereby obtain the latest version of the MD page. Consistent with other discussion herein in at least one embodiment, the metadata updates or changes for the MD page can come from an associated custom bucket of each bucket set if the MD page has an associated type T included in the custom types list, and otherwise, the updates or changes for the MD page can come from an associated regular bucket of each bucket set. From the step 612, control proceeds to the step 614.

At the step 614, the latest version of the MD page C1 just constructed can be stored in the node's volatile memory cache. In response to the read request, the latest version of the MD page just constructed and stored in the node's volatile memory cache can be returned.

As discussed above, the full MD page construction (e.g., step 612) to obtain a latest version of the requested MD page can occur when the requested MD page is not located in the node's cache.

What will now be described are techniques that can be performed in an embodiment in accordance with the present disclosure when processing MD page changes or updates for writes to one or more MD pages.

In connection with an active-active appliance or system such as described herein, the nodes should be synchronized to guarantee consistent access and updates of the same data and MD objects or MD pages from both nodes. For example, one particular method or protocol that can be used in connection with performing MD updates to one or more MD pages in at least one embodiment in accordance with the techniques herein is described in some detail herein and in further detail, for example, in U.S. application Ser. No. 17/243,252, filed on Apr. 28, 2021, "System and Method for Consistent Metadata Access Based on Local Locks Semantics in a Multi-Node Cluster", Shveidel, et al., (the '252 application) which is incorporated by reference herein in its entirety. More generally, any suitable technique can be used to synchronize and coordinate access and updates to the MD pages as stored in the in-memory delta logs of the node-local memories, the log stored on NVRAM that can be used to log user data and metadata updates, and the MD page store (e.g., as may be stored on the BE PDs).

The '252 application uses a technique to synchronize access and updates to shared MD pages among the two nodes of an appliance by combining locking and transactional update logic using a single round or message exchange between the two nodes. The general technique described in the '252 application has been adapted for use in connection with the techniques of the present disclosure. Additionally, an embodiment can generally use any suitable protocol in connection with the techniques of the present disclosure to synchronize access and updates to the shared MD pages among the two nodes of the dual node appliance.

What will now be described is processing that can be performed in connection with two nodes of the dual node appliance to synchronize access to one or more MD pages involved in a transaction. Thus, in this context and example described in the following paragraphs, updates to all of the one or more MD pages can be required for the transaction initiated by an initiator. The metadata updates to the one or more MD pages can be performed, for example, in connection with processing a write I/O received by the initiator node which is initiating the transaction of metadata updated applied to the one or more MD pages.

Figure 9A:
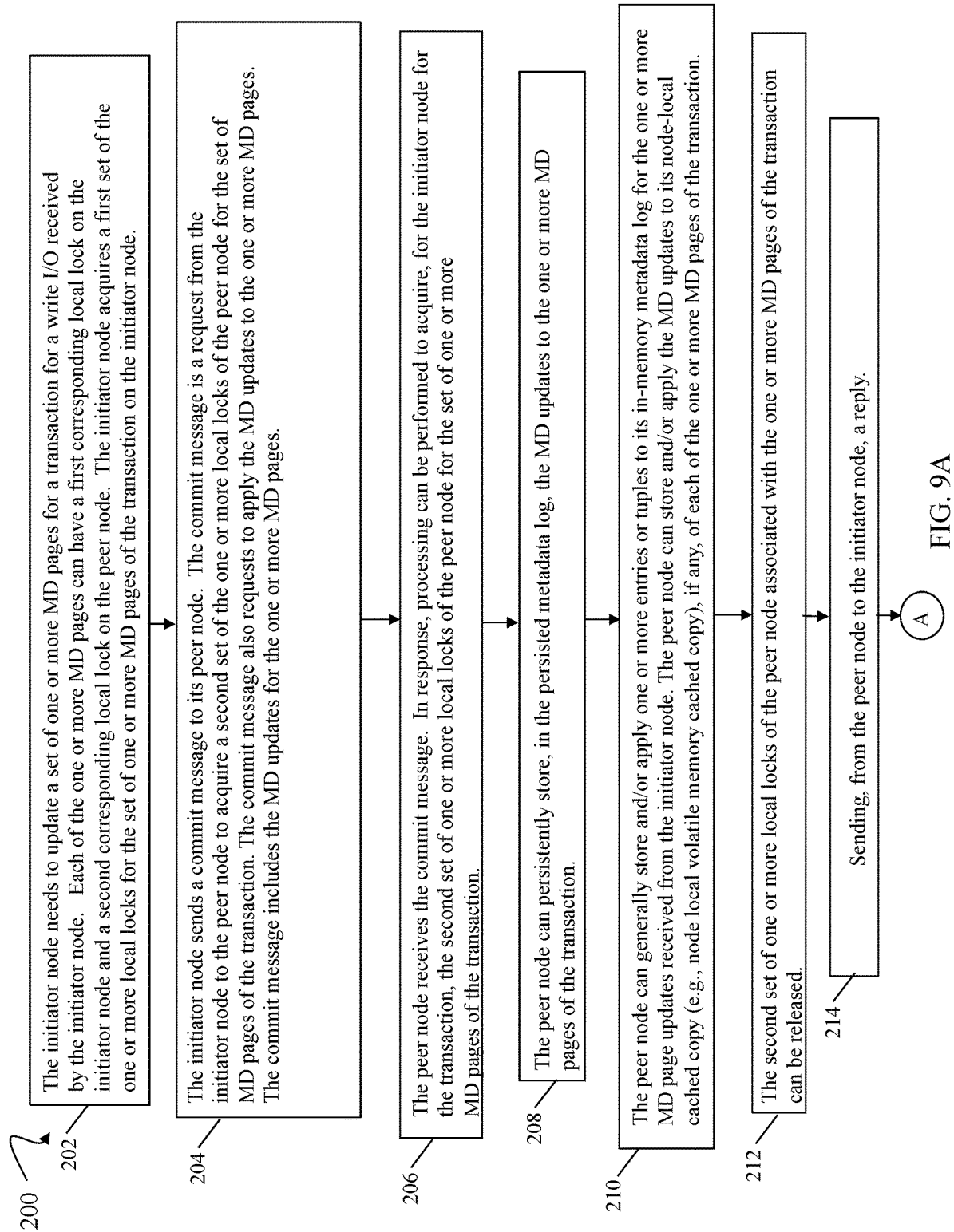
Figure 9B:
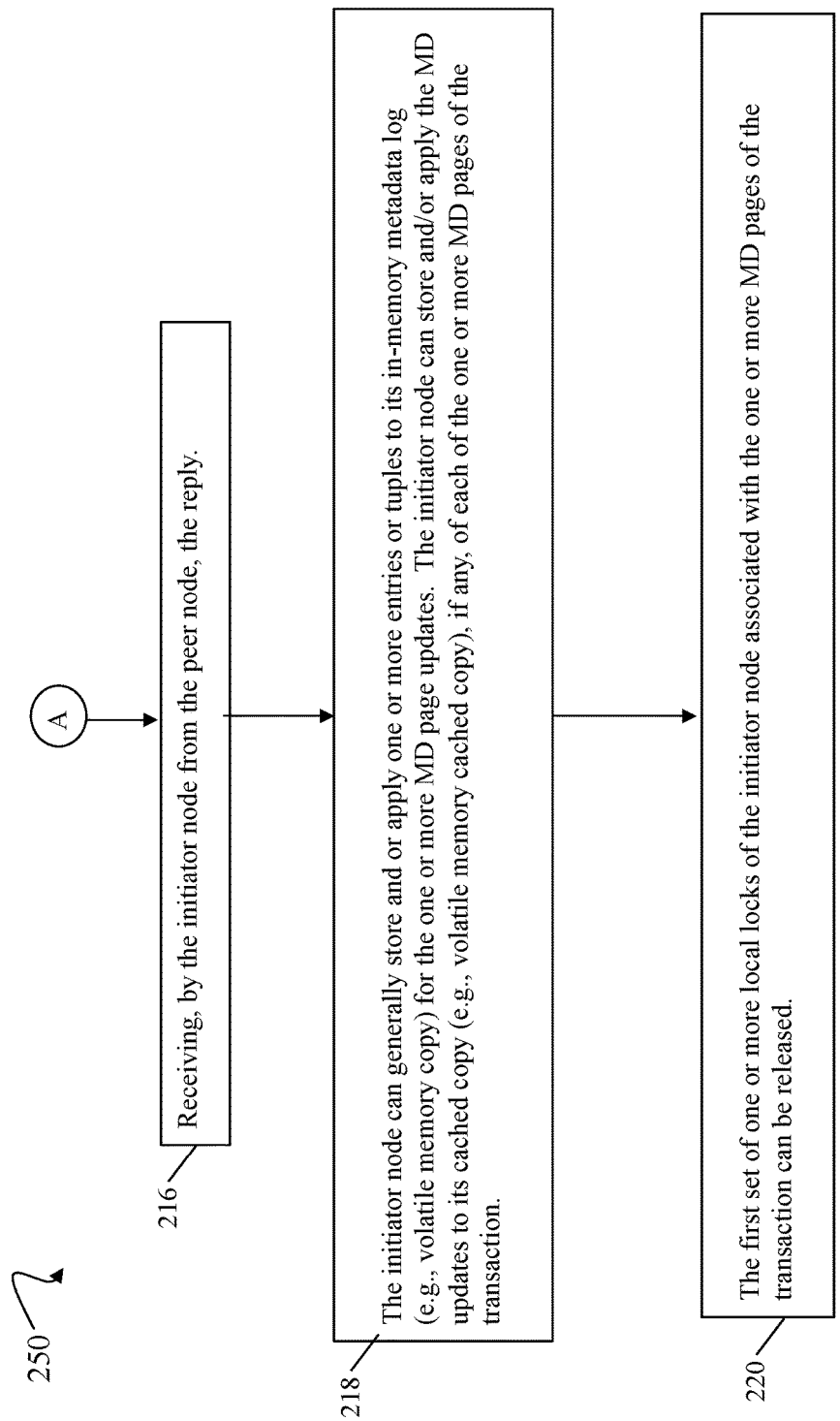

The flowchart of FIGS. 9A and 9B generally describes processing in which an initiator node (sometimes referred to simply as initiator) needs to perform updates on a set of one or more MD pages. Consistent with the '252 application, the flowchart of FIGS. 9A and 9B provides efficient "local" MD page lock semantics and schema. Specifically, the initiator node and its peer node (sometimes referred to simply as a peer) can each have their own local locks for MD pages accessible to both nodes. A request by an initiator node for the local lock for a MD page on the initiator node is a request for exclusive access to the MD page that is node local (e.g., within the scope of the initiator node). A request by an initiator node for the local lock for a MD page on its peer node is a request for exclusive access to the MD page that is node local (e.g., within the scope of the node). Thus local locks of one node can be acquired separately with no dedicated internode lock synchronization between nodes. For each MD page, the initiator node can have a first corresponding local lock and the peer node may have a second corresponding local lock. An initiator node that needs to apply an update to a particular MD page and requires exclusive access to the particular MD page must acquire the first local lock of the initiator node for the particular MD page and also acquire the second local lock of the peer node for the particular MD page prior to applying the update. Once the initiator node has acquired the local lock of the initiator node for the MD page and the local lock of the peer node for the MD page, the initiator node has exclusive access to the MD page and the update can be applied to the MD page. Once the update to the MD page has been applied, the local locks of the initiator node and the peer node previously acquired for the MD page can be released.

The local lock for a MD page can be characterized as local with respect to a single node for the MD page and can be used to provide lock semantics and serialization of access in the scope of only the single node. Thus, in order for a node in a dual node appliance to acquire exclusive access to a MD page, the node needs to acquire a first local lock for the MD page from a first of the two nodes and also acquire a second local lock for the MD page from the remaining node (e.g., a second of the two nodes).

Referring to FIGS. 9A and 9B, shown is a flowchart of processing steps that can be performed in an embodiment in accordance with the techniques herein. Consistent with other discussion herein, the FIGS. 9A and 9B describe processing that can be performed in connection with one particular protocol of the '252 application using a single round of message-reply exchange between an initiator node and its peer node when the initiator node performs processing to service a transaction and apply updates to one or more MD pages of the transaction.

At the step 202, the initiator node needs to update a set of one or more MD pages for a transaction such as, for example, for a write I/O received by the initiator node. The write I/O can write user data or write data to a target logical address expressed as a LUN and LBA. In this case, to service the write I/O operation, the initiator node performs metadata updates to set of one or more MD pages used to map the target logical address to a physical location where the new user data or write data is stored. In at least one embodiment such metadata updates to the MD pages used to access the physical storage location mapped to the target logical address where the new write data is written can be performed when destaging the write data or user data to the BE PDs providing the non-volatile storage for the write data or user data.

The set of one or more MD pages can be included in the MD pages of the MD mapping information or structure (e.g., such as described in connection with FIGS. 3, 4, 5 and 6). Each of the one or more MD pages can have a first corresponding local lock on the initiator node and a second corresponding local lock on the peer node. In the step 202, the initiator node acquires a first set of the one or more local locks for the set of one or more MD pages of the transaction on the initiator node. From the step 202, control proceeds to the step 204.

At the step 204, the initiator node sends a commit message to its peer node. The commit message is a request from the initiator node to the peer node to acquire a second set of the one or more local locks of the peer node for the set of MD pages of the transaction. The commit message also requests to apply the MD updates to the one or more MD pages. The commit message in this protocol illustrated also includes, as a commit message payload, the MD updates (e.g., updated metadata or content) for the one or more MD pages. From the step 204, control proceeds to the step 206.

At the step 206, the peer node receives the commit message. In response, processing can be performed to acquire, for the initiator node for the transaction, the second set of one or more local locks of the peer node for the set of one or more MD pages of the transaction. From the step 206, control proceeds to the step 208.

At the step 208, the peer node can persistently store, in the persisted metadata log 510, the MD updates to the one or more pages of the transaction. In at least one embodiment, the commit message payload can include the tuples or entries recorded for the MD updates, where the tuples or entries are created by the initiator node (e.g., step 204) and sent to the peer node (e.g., step 206). The peer node can store in the persisted metadata log 510 the MD updates to the one or more pages of the transaction by storing the tuples or entries of the commit message payload received from the initiator node. Generally, the peer node can store the tuples or entries received "as is" from the initiator node without any changes. From the step 208, control proceeds to the step 210.

At the step 210, the peer node can store one or more entries or tuples in its in-memory metadata log (e.g., in the peer node's volatile memory) for the one or more MD page updates received from the initiator node. The peer node can store in its in-memory metadata log (e.g., active bucket set in the peer node's volatile memory) the MD updates to the one or more pages of the transaction by storing the tuples or entries of the commit message payload received from the initiator node (e.g., received in the step 206). In at least one embodiment, the in-memory metadata logs of the initiator node and the peer node can mirror each other in that the in-memory metadata logs of the initiator and peer nodes can represent the same MD updates. The peer node can store and apply the MD updates to its node-local cached copy (e.g., node local volatile memory cached copy), if any, of each of the one or more MD pages of the transaction. Consistent with other discussion herein, the MD page updates represented as tuples each can be stored in and/or applied to an associated custom bucket or an associated regular bucket depending, at least in part, on the type T associated with each tuple. From the step 210, control proceeds to the step 212.

At the step 212, the second set of one or more local locks of the peer node that are associated with the one or more MD pages of the transaction can be released. From the step 212, control proceeds to the step 214.

At the step 214, a reply message can be sent from the peer node to the initiator node indicating completion of the commit processing by the peer node. From the step 214, control proceeds to the step 216.

At the step 216, the initiator node receives the reply from the peer node. From the step 216, control proceeds to the step 218.

At the step 218, the initiator node can store one or more entries or tuples in its in-memory metadata log (e.g., volatile memory copy) for the one or more MD page updates received from the initiator node. The initiator node can store and apply the MD updates to its cached copy (e.g., volatile memory cached copy), if any, of each of the one or more MD pages of the transaction. Consistent with other discussion herein, the MD page updates represented as tuples each can be stored in and/or applied to an associated custom bucket or an associated regular bucket depending, at least in part, on the type T associated with each tuple. From the step 218, control proceeds to the step 220.

At the step 220, the first set of one or more local locks of the initiator node associated with the one or more MD pages of the transaction can be released.

In connection with a local lock requested by an initiator node, such as in connection with the steps 202 and 206, if the requested local lock for a MD page is not available and is currently held by a node in connection with another transaction, processing for the request by the initiator can be blocked and wait in a queue associated with the local lock. In at least one embodiment, if there are multiple requests for multiple transactions blocked and waiting for the local lock, the multiple requests can be placed in the queue in a FIFO (first in first out) order in accordance with the time order in which the multiple requests attempted to acquire the local lock. In response to releasing the local lock of the FIFO queue, a next waiting request, if any, from the queue can proceed to attempt to acquire the local lock of the peer node for the transaction associated with the next waiting request. For example, such a queue as just described can be used in connection each local lock of an initiator node when attempting to acquire its own one or more local locks for one or more MD pages of the transaction in the step 202. Additionally, such a queue as just described can be used in connection each local lock of a peer node when attempting to acquire, on behalf of the commit request from the initiator node for a transaction, one or more local locks of the peer node for the one or more MD pages of the initiator's transaction in the step 206.

In connection with the foregoing description in FIGS. 9A and 9B, the initiator node receiving the write I/O operation can initiate updating the set of MD pages associated with accessing data stored on a particular LUN and can record (e.g., in the step 218) all the metadata updates to the set of MD pages in entries of its in-memory metadata log. In connection with the foregoing description in FIGS. 9A and 9B, the peer node that does not receive the write I/O operation or more generally does not initiate the updating of the set of MD pages associated with accessing data stored on a particular LUN can record (e.g., in the step 210) all the metadata updates to the set of MD pages in entries of its in-memory metadata log in entries or tuples.

Figure 10:
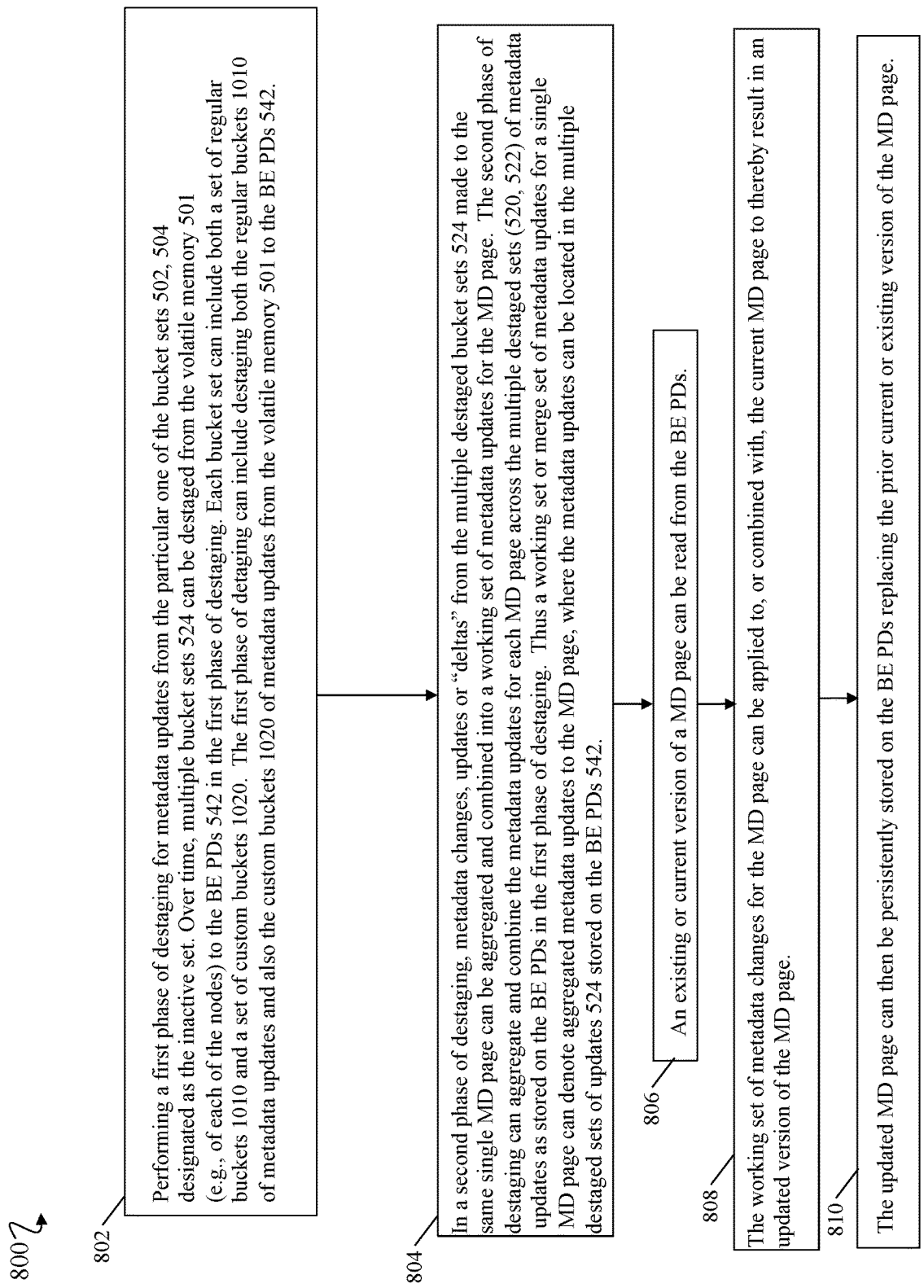

Referring to FIG. 10, shown is a flowchart 800 of processing steps that can be performed in at least one embodiment in connection with destaging metadata changes in accordance with the techniques of the present disclosure. The flowchart 800 generally summarizes processing described above.

At the step 802, a first phase of destaging can be performed by a node for metadata updates from the particular one of the bucket sets 502, 504 (e.g. the in-memory metadata log of the node) designated as the inactive set. Over time, multiple bucket sets 524 can be destaged from the volatile memory 501 (e.g., of each of the nodes) to the BE PDs 542 in the first phase of destaging. Consistent with discussion above, each bucket set can include both a set of regular buckets 1010 and a set of custom buckets 1020. The first phase of detaging can include destaging both the regular buckets 1010 of metadata updates and also the custom buckets 1020 of metadata updates from the volatile memory 501 to the BE PDs 542. From the step 802, control proceeds to the step 804.

At the step 804, in a second phase of destaging as can be performed by a node, metadata changes, updates or "deltas" from the multiple destaged bucket sets 524 made to the same single MD page can be aggregated and combined into a working set of metadata updates for the MD page. The second phase of destaging can include aggregating and combining the metadata updates for each MD page across the multiple destaged sets (520, 522) of metadata updates as stored in the destaged bucket sets 524 on the BE PDs 542 in the first phase of destaging. Thus a working set or merge set of metadata updates for a single MD page can denote aggregated metadata updates to the MD page, where the metadata updates can be located in the multiple destaged sets of updates 524 stored on the BE PDs 542. From the step 804, control proceeds to the step 806.

The steps 806, 808 and 810 are described in connection with a single MD page. More generally these same steps can be repeated for other MD pages. In at least one embodiment, the steps 806, 808 and 810 can also be processing steps included in the second phase of destaging.

At the step 806, a node reads an existing or current version of a MD page from the BE PDs such as from the persisted MD page store 540. In at least one embodiment, the existing or current version of the MD page can be read from the MD page store 540 and then stored in a volatile memory location in the cache of the node. From the step 806, control proceeds to the step 808.

At the step 808, the node can perform processing to combine or apply the working set of metadata changes for the MD page to the current MD page as stored in the node's cache to thereby result in an updated version of the MD page being stored in the node's cache. Consistent with other discussion herein, the particular manner in which the metadata updates are generally applied to a MD page can vary with whether the updates are from a custom bucket or regular bucket, and also vary with the particular type of the MD page. From the step 808, control proceeds to the step 810.

At the step 810, the node can store the updated MD page persistently in the MD page store 540 on the BE PDs thereby replacing the prior current or existing version of the MD page.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
receiving a first metadata (MD) update for a first MD page, wherein the first MD update has an associated first type;
determining whether the first type is included in a first set of custom MD types;
responsive to determining the first type is included in the first set of custom MD types, performing first processing including:
determining a first custom bucket handle of a first custom bucket for the first MD update based at least in part on the first type and a first logical index (LI) uniquely identifying the first MD page from a plurality of MD pages, wherein the first custom bucket is included in a plurality of custom buckets which are addressed and accessed using a non hash-based schema; and
applying the first MD update to a first custom bucket associated with the first custom bucket handle; and
responsive to determining the first type is not included in the first set of custom MD types, performing second processing including:
determining a first regular bucket handle of a first regular bucket for the first MD update based at least in part on the first LI of the first MD page, wherein the first regular bucket is included in a plurality of regular buckets; and
applying the first MD update to a first regular bucket associated with the first regular bucket handle, and
wherein the plurality of custom buckets is associated with MD pages expected to be updated at a higher frequency than other MD pages associated with the plurality of regular buckets.

2. The computer-implemented method of claim 1, wherein said determining the first regular bucket handle for the first MD update based at least in part on the first LI of the first MD page, as included in the second processing, further includes:
  determining, using a hash function, a first hash value for the first MD update based at least in part on the first LI of the first MD page.

3. The computer-implemented method of claim 2, wherein the first regular bucket handle is determined, at least in part, based on the first hash value; wherein the first regular bucket handle is a bucket number or identifier that identifies the first regular bucket included in the plurality of regular buckets; wherein each of the plurality of regular buckets is associated with a different one of a first plurality of MD pages; and wherein the first plurality of MD pages is included in the plurality of MD pages.

4. The computer-implemented method of claim 3, wherein a rate or frequency of MD updates expected for each of the first plurality of MD pages is below a specified threshold.

5. The computer-implemented method of claim 4, wherein the second processing includes:
  storing the first MD update as an entry in the first regular bucket.

6. The computer-implemented method of claim 1, wherein the plurality of custom buckets is associated with a second plurality of MD pages, wherein a rate or frequency of MD updates expected for each of the second plurality of MD pages is above a specified threshold, and wherein the second plurality of MD pages is included in the plurality of MD pages.

7. The computer-implemented method of claim 6, wherein the first custom bucket is associated with at least one of the second plurality of MD pages.

8. The computer-implemented method of claim 7, wherein the first custom bucket is associated with at least two MD pages of the second plurality of MD pages, and wherein the first custom bucket includes fields or entries corresponding to data items of the at least two MD pages.

9. The computer-implemented method of claim 7, wherein the at least one MD page associated with the first custom bucket includes a plurality of counters, and wherein the first custom bucket includes a plurality of fields or entries corresponding to the plurality of counters.

10. The computer-implemented method of claim 9, wherein each of the plurality of fields or entries of the first custom bucket is associated with one of the plurality of counters of the at least one MD page, and said each field or entry associated with said one counter denotes an aggregated value of updates to said one counter.

11. The computer-implemented method of claim 10, wherein said aggregated value of updates to said one counter denotes a relative amount by which to modify a current value of said one counter of the at least one MD page as stored in a persistently stored MD page store.

12. The computer-implemented method of claim 11, wherein the MD page store is provisioned from non-volatile storage of physical storage devices providing backend non-volatile storage in a data storage system.

13. The computer-implemented method of claim 12, wherein the first type is included in the first set of custom MD types, the first processing is performed, the first MD page is included in the at least one MD page associated with the first custom bucket, the first MD page includes a first plurality of counters, the first custom bucket includes a first plurality of fields or entries each associated with a corresponding one of the first plurality of counters, and each of said first plurality of fields or entries associated with said corresponding one counter of the first plurality denotes an aggregated value of updates to said corresponding one counter.

14. The computer-implemented method of claim 13, wherein said aggregated value of updates to said corresponding one counter denotes a relative amount by which to modify a current value of said one corresponding counter of the first MD page as stored in a persistently stored MD page store.

15. The computer-implemented method of claim 14, further comprising:
  destaging MD updates to the first MD page, wherein said destaging includes:
    reading a current version of the first MD page from the MD page store;
    applying MD updates denoted by the first plurality of fields or entries of the first custom bucket to the first plurality of counters of the first MD page thereby generating an updated version of the first MD page; and
    persistently storing the updated version of the first MD page in the MD page store whereby the updated version of the first MD page replaces the current version of the first MD page in the MD page store.

16. The computer-implemented method of claim 15, wherein the first MD update is represented as a tuple including the LI, the first type, an entry index (EI) and a first value; wherein the first MD update is an update to a first counter of the first plurality of counters of the first MD page having an associated first field or entry of the first plurality of fields or entries of the first custom bucket; wherein the EI is used, at least in part, in determining the first field or entry of the first custom bucket associated with the first counter; and wherein the first value denotes an amount by which to adjust the first counter.

17. The computer-implemented method of claim 1, wherein the first type is included in the first set of custom MD types, and wherein the computer-implemented method further comprises:
  specifying a plurality of callbacks for the first type, wherein each of the plurality of callbacks denotes one of a plurality of code entities that performs customized processing for one of a plurality of operations in connection with MD updates to a MD page of the first type.

18. The computer-implemented method of claim 17, wherein the plurality of callbacks includes a first callback that applies MD updates, a second callback that destages MD updates, and a third callback that creates a custom bucket, and wherein the computer-implemented method further includes:
  invoking the first callback to apply the first MD update for the first MD page to the first custom bucket, wherein the first callback performs processing including said applying of the first processing;
  invoking the second callback to destage MD updates of the first custom bucket for the first MD page; and
  invoking the third callback to create the first custom bucket.

19. A system comprising:
one or more processors; and
one or more memories comprising code stored thereon that, when executed, performs a method of comprising:
  receiving a first metadata (MD) update for a first MD page, wherein the first MD update has an associated first type;

determining whether the first type is included in a first set of custom MD types;

responsive to determining the first type is included in the first set of custom MD types, performing first processing including:

determining a first custom bucket handle of a first custom bucket for the first MD update based at least in part on the first type and a first logical index (LI) uniquely identifying the first MD page from a plurality of MD pages, wherein the first custom bucket is included in a plurality of custom buckets which are addressed and accessed using a non hash-based schema; and applying the first MD update to a first custom bucket associated with the first custom bucket handle; and responsive to determining the first type is not included in the first set of custom MD types, performing second processing including:

determining a first regular bucket handle of a first regular bucket for the first MD update based at least in part on the first LI of the first MD page, wherein the first regular bucket is included in a plurality of regular buckets; and applying the first MD update to a first regular bucket associated with the first regular bucket handle, and wherein the plurality of custom buckets is associated with MD pages expected to be updated at a higher frequency than other MD pages associated with the plurality of regular buckets.

20. A non-transitory computer readable medium comprising code stored thereon that, when executed, performs a method comprising:

receiving a first metadata (MD) update for a first MD page, wherein the first MD update has an associated first type;

determining whether the first type is included in a first set of custom MD types;

responsive to determining the first type is included in the first set of custom MD types, performing first processing including:

determining a first custom bucket handle of a first custom bucket for the first MD update based at least in part on the first type and a first logical index (LI) uniquely identifying the first MD page from a plurality of MD pages, wherein the first custom bucket is included in a plurality of custom buckets which are addressed and accessed using a non hash-based schema; and applying the first MD update to a first custom bucket associated with the first custom bucket handle; and responsive to determining the first type is not included in the first set of custom MD types, performing second processing including:

determining a first regular bucket handle of a first regular bucket for the first MD update based at least in part on the first LI of the first MD page, wherein the first regular bucket is included in a plurality of regular buckets; and applying the first MD update to a first regular bucket associated with the first regular bucket handle, and wherein the plurality of custom buckets is associated with MD pages expected to be updated at a higher frequency than other MD pages associated with the plurality of regular buckets.

\* \* \* \* \*